(12) United States Patent
Jinnai et al.

(10) Patent No.: US 6,723,392 B1
(45) Date of Patent: *Apr. 20, 2004

(54) LIGHT SCATTERING SHEET, LIGHT SCATTERING COMPOSITE SHEET, AND LIQUID CRYSTAL DISPLAY

(75) Inventors: Hiroshi Jinnai, Kyoto (JP); Hiroyuki Takemoto, Sendai (JP); Hiroshi Takahashi, Himeji (JP); Masanori Hiraishi, Osaka (JP); Yoshiyuki Nishida, Nagareyama (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/701,494

(22) PCT Filed: Mar. 13, 2000

(86) PCT No.: PCT/JP00/01516

§ 371 (c)(1),
(2), (4) Date: Nov. 29, 2000

(87) PCT Pub. No.: WO00/60384

PCT Pub. Date: Oct. 12, 2000

(30) Foreign Application Priority Data

Mar. 31, 1999 (JP) .............................. 11-91747
Jun. 9, 1999 (JP) .......................... 11-163030
Jul. 7, 1999 (JP) .......................... 11-192972
Aug. 3, 1999 (JP) .......................... 11-220475
Aug. 19, 1999 (JP) .......................... 11-232952

(51) Int. Cl.$^7$ .............. B32B 5/00; B32B 27/30; B32B 27/34; B32B 27/36; C08I 3/00
(52) U.S. Cl. ............... 428/1.1; 428/1.6; 428/212; 428/220; 428/412; 428/421; 428/447; 428/474.4; 428/480; 428/500; 428/522; 428/532; 525/50

(58) Field of Search .................. 428/1.1, 212, 220, 428/323, 412, 421, 447, 474.4, 480, 500, 522, 532, 913, 1.6; 525/50

(56) References Cited

U.S. PATENT DOCUMENTS 5,900,309 A * 5/1999 Kitamura et al. ............ 428/212
6,573,958 B2 * 6/2003 Takahashi et al. ............ 349/86

FOREIGN PATENT DOCUMENTS

JP    B2618430    3/1986

(List continued on next page.)

OTHER PUBLICATIONS

English translation of JP 11–84360, Mar. 1999.*

(List continued on next page.)

Primary Examiner—Ramsey Zacharia
(74) Attorney, Agent, or Firm—Birch, Stewart, Kolasch & Birch, LLP

(57) ABSTRACT

A light-scattering sheet having a phase separation structure comprised of a plurality of solid components varying in refractive index is used to construct a liquid crystal display device. In a first embodiment, the light-scattering sheet is disposed in a defined position within a reflecting LCD device. Thus, in a reflecting LCD device comprising a liquid crystal cell constituted of a transparent front electrode plate having a substrate carrying a transparent conductive layer, a back electrode plate having a substrate carrying a conductive layer and a liquid crystal and, as disposed forwardly of the liquid crystal cell, a polarizer, the light-scattering sheet is interposed (i) between the polarizer and the front electrode plate or (ii) between the back electrode plate and a reflector disposed behind the back electrode plate. Alternatively, (iii) the substrate sheet may be constituted of the light-scattering sheet. In a second embodiment, a light-scattering sheet having an isotropic bicontinuous phase structure comprised of a plurality of polymers varying in refractive index is used.

19 Claims, 8 Drawing Sheets

FOREIGN PATENT DOCUMENTS

| | | |
|---|---|---|
| JP | A63228887 | 9/1988 |
| JP | A6172629 | 6/1994 |
| JP | A6258624 | 9/1994 |
| JP | A727904 | 1/1995 |
| JP | A798452 | 4/1995 |
| JP | A7114013 | 5/1995 |
| JP | A7261171 | 10/1995 |
| JP | A7318926 | 12/1995 |
| JP | A9113902 | 5/1997 |
| JP | A9169867 | 6/1997 |
| JP | A112706 | 1/1999 |
| JP | A1184360 | 3/1999 |

OTHER PUBLICATIONS

Machine assisted translation of JP 11–084360, Mar. 1999.*
Japanese Liquid Crystal Society Lecture Meeting, Synopsis of the Lectures, p. 82, Oct. 1998.

* cited by examiner

LIGHT SCATTERING SHEET, LIGHT SCATTERING COMPOSITE SHEET, AND LIQUID CRYSTAL DISPLAY

TECHNICAL FIELD

The present invention relates to a light-scattering sheet (film) for liquid crystal devices useful for the high-luminance display of images, a method of producing the sheet, a light-scattering composite sheet utilizing said sheet, a liquid crystal display device, and a method of producing said light-scattering composite sheet.

BACKGROUND ART

The liquid crystal display (LCD) device is utilized broadly in the display segments of personal computers, word processors, LC televisions, chronometers, desktop calculators and other electrical and electronic products. Since the liquid crystal by itself does not emit light, a backlight for illuminating the liquid crystal cell from the back side is used in liquid crystal display devices to the exclusion of low-luminance applications such as watches and desktop calculators.

Recent years have witnessed advances in the construction of infrastructures for telecommunications systems such as internets and in the network consolidation of information through the computer-communications equipment integration. By network consolidation, the access to information is freed from restrictions as to time and place. For an efficient utilization of such networks, portable information terminals such as PDA (personal digital assistance) have recently been developed. Moreover, in lieu of notebook-sized personal computers, further-downsized mobile personal computers of reduced thickness and weight are under development.

Since portability is required of these devices, it is necessary to reconcile the need for a longer battery operating time with the need for reduced thickness and downsizing of communications devices. Therefore, display devices for use in such portable telecommunications equipment must be of reduced thickness, reduced weight and low power consumption. Particularly for attaining the low power consumption goal, a technology for brightening the display screen by exploiting natural light has been sought for replacing the conventional technology using a backlight. The display mode which is considered to be most promising is a reflecting liquid crystal display device. Particularly, to keep abreast with the increasing versatility of data accompanying the ever-continuing advances in multimedia, there is a demand for reflecting-mode liquid crystal display devices not only capable of color display and high image-quality (high-definition) display but also of low production cost.

As the reflecting liquid crystal display device, there is known a variety of devices such as TN (twisted nematic) and STN (super twisted nematic) devices but for color display and high-definition display, devices utilizing a polarizer (one polarizer plate type) is preferred. For example, the R-OCB mode in which the liquid crystal layer is of the HAN (hybrid aligned nematic) alignment has excellent characteristics such as low voltage, wider viewing angle, high-speed response, middle color rendition and high contrast. As the display device capable of forming a high-definition image on the screen, active matrix type liquid crystal display devices such as TFT (thin film transistor) which control all pixels each independently are also generally available. However, TFT and other active matrix type liquid crystal display devices must be fabricated using glass substrates because hundreds of thousands or more transistors must be formed on a substrate. In contrast, STN (super twisted nematic) liquid crystal display devices which perform matrix image displays using bar electrodes are inexpensive as compared with TFT devices and, in addition, plastic substrates can be used as the substrates for electrodes (support plates) and reflecting-mode plastic LCDs can be fabricated.

In the reflecting type LCD, the brightness of the screen is insured in such a manner that the light incident on the liquid crystal layer (natural light, ambient light) is efficiently taken in and reflected with a reflector and the reflected light is appropriately scattered (for the prevention of total reflection). When a sufficient brightness level cannot be obtained, depending on the environment of use, even if the natural or ambient light is fully exploited, a front light is at times used for supplying light from the side of the display screen of the LCD. As the reflector, a light-reflecting back electrode system utilizing light reflective electrodes and a laminate sheet such that a reflecting film has been laminated on the surface of the electrode-carrying substrate can be employed. For example, in Japanese Patent Application Laid-Open No. 22887/1998 (JP-63-22887A) and Photofabrication Symposium '92 sponsored by the Japanese Society of Printing, the fundamental technology about reflecting type LCD and the liquid crystal device given an enlarged viewing angle through the prevention of total reflection by means of a surface-corrugated metal thin film as the back electrode (lower electrode) were introduced. Such a reflecting liquid crystal display device is designed to scatter light for avoiding specular reflection and for this purpose, it includes a reflector (or a light-reflecting back electrode) whose surface has been appropriately roughened. However, it requires an elaborate processing technique and a high cost. Moreover, when the display is to be a color display, a color filter is used in addition to said polarizer. In case a color filter is used, the proportion of loss of reflected light is increased and the above diffusion plate system cannot impart enough brightness to the display screen. In the color system, it is particularly important to impart high luminance by directing diffused light in a given direction (directed diffusion). In order to increase this directionality with the diffusion-reflector system, it is necessary to precisely control the geometry and distribution pattern of reflector surface irregularities but this is a costly procedure.

For the purpose of insuring a high luminance by scattering reflected light, there has been disclosed a technology in which, in lieu of a light-diffusing reflector, the liquid crystal layer is constituted as a dispersed structure such that the liquid crystal and a high polymer are interdispersed (Japanese Patent Application Laid-Open No. 258624/1994). Also known is a liquid crystal display device in which a transmitting type light-scattering sheet is used in lieu of a diffuser plate.

For example, a technology comprising forming a light-scattering transparent resin layer either internally or externally of a liquid crystal cell is known. As an example of the display device having a light-scattering layer within the liquid crystal cell, Japanese Patent Application Laid-Open No. 98452/1995 (JP-7-98452A) discloses a display device comprising a transparent resin layer (light-scattering layer) containing a dispersion of fine particles as interposed between the electrode and substrate sheet (electrode-supporting substrate) of the electrode plate. Moreover, Japanese Patent Application Laid-Open No. 318926/1995 (JP-7-318926A) discloses a display device comprising a support plate carrying a transparent electrode, a liquid crystal layer, and as interposed therebetween, a diffusion layer comprising randomly oriented liquid crystalline polymer molecules. Meanwhile, Japanese Patent Application Laid-Open No. 261171/1995 (JP-7-261171A) discloses a display device having a light diffusing layer externally of a liquid cell, specifically a display device comprising a polarizer film on the outer surface of an electrode plate and, as formed on the surface of said polarizer film, a light-scattering layer comprising a phase-separated dispersion of two or more kinds of resins varying in refractive index. Japanese Patent Application Laid-Open No. 8430/1986 (JP-61-8430B) discloses a liquid crystal display device comprising a polarizer layer formed on the front side of a liquid crystal cell and, as formed thereon, a light-scattering layer. However, the polarizer plate usually has a highly sophisticated surface hardness characteristic and an adequate anti-glare characteristic. Therefore, when a light-scattering layer is formed on the surface of such a polarizer plate, the surface of the display device (that is the light-scattering sheet) becomes vulnerable to marring so that the visibility of the screen of the reflecting type liquid crystal display apparatus is lowered to adversely affect the image quality. In particular, it becomes difficult to maintain the image quality over a long time. Furthermore, because a double image, namely the liquid crystal image and the image from the light-scattering layer is formed, the sharpness of the image is sacrificed (blurred image) to adversely affect the image quality. Meanwhile, a resin sheet as polymerized by utilizing holography for imparting directionality to a transmitting type light-scattering sheet is known (The synopsis of Lectures at Japanese Society of Liquid Crystal Science, 1998) but the production process is complicated and costly.

As disclosed in Japanese Patent Application Laid-Open No. 27904/1995 (JP-7-27904A) and Japanese Patent Application Laid-Open No. 113902/1997 (JP-9-113902B), there also are known transmitting type liquid crystal display units such that a particle-dispersion sheet having an islands-in-an ocean structure comprised of plastic beads and a transparent resin matrix is interposed between a back light and a liquid crystal cell.

Under the circumstances, the object of the present invention is to provide a light-scattering sheet (or film) conducive to a liquid crystal display of high image quality, a light-scattering composite sheet (or film), a liquid crystal display device, and a method of producing said light-scattering sheets.

It is a further object of the present invention to provide a light-scattering sheet (or film) capable of imparting diffusibility and directionality to reflected light, a light-scattering composite sheet (or film), a liquid crystal display device, and a method of producing said light-scattering sheets.

It is another object of the present invention to provide a light-scattering composite sheet (or film) useful for the manufacture of a high-luminance, high definition liquid crystal display device at low cost and a liquid crystal device utilizing said composite sheet (or film).

It is a further object of the present invention to provide a liquid crystal display device insuring a sustained image quality over a long period of time.

It is yet another object of the present invention to provide a method by which a directionally diffusing sheet (or film) can be produced with ease.

DISCLOSURE OF INVENTION

The inventors of the present invention made intensive investigations to accomplish the above objects and found that subjecting a plurality of resins varying in refractive index to spinodal decomposition gives an isotropic bicontinuous phase structure with ease and that by using a sheet having such a bicontinuous phase structure, a high order of directionality can be imparted to diffused light. The inventors further discovered that with a composite sheet composed of a light-scattering sheet and a polarizer sheet, an optical retardation film, a reflector or a transparent electrode layer, not only an image of high quality can be produced but also a liquid crystal display device can be manufactured easily and at low cost. It was further discovered that when the light-scattering sheet is disposed in a defined position in a reflecting type liquid crystal device, the durability of the reflecting type liquid crystal display device can be improved and, in addition, an image of high precision can be obtained. The present invention has been developed on the basis of the above findings.

The light-scattering sheet of the present invention, therefore, comprises a light-scattering layer having an isotropic bicontinuous phase structure comprised of a plurality of polymers varying in refractive index. The average interphase distance of this bicontinuous phase structure may for example be about 1 to 20 $\mu$m and the difference in refractive index between the component polymers may for example be about 0.01 to 0.2. The plurality of polymers may have a lower critical solution temperature (LCST) type phase separation mode. The critical solution temperature of the composition comprising said plurality of polymers may for example be about 50 to 300° C. The average molecular weight of each component polymer may for example be about 10,000 to 300,000 and the polymer may for example be a styrenic resin, (meth)acrylic resin, avinyl ether resin, a halogen-containing resin, a polycarbonate resin, a polyester resin, a polyamide resin, a silicone resin, a cellulose derivative, or a rubber or elastomer. The light-scattering sheet of the present invention has a transmittance value of 70 to 100% and is capable of diffusing incident light isotropically. The diffused light has a maximum intensity distribution at a diffusion angle of 3 to 60°. For example, when the intensity of light transmitted through the light-scattering sheet is plotted against diffusion angle ($\theta$), the ratio of the intensity I ($\theta 0$) of linearly transmitted light to the maximum intensity I ($\theta$max) of diffusedly transmitted light, i.e. [I ($\theta 0$)/I ($\theta$max)], may be about 3000/1 to 1/1.

The light-scattering composite sheet according to the present invention consists of a light-scattering sheet comprising a light-scattering layer and, as formed at least on one side of said light-scattering sheet, at least one member selected from the group consisting of a polarizer, an optical retardation sheet, a reflector and a transparent electrode layer. The light-scattering layer has a phase separation structure composed of a plurality of solid components varying in refractive index, with the difference in refractive index being about 0.01 to 0.2. The light-scattering layer may have a particle dispersion structure comprised of a transparent matrix or base resin and, as dispersed therein, a fine powder having a different refractive index, or may have an isotropic bicontinuous phase structure.

The liquid crystal display device of the present invention includes a light-scattering sheet comprising a light-scattering layer. In a first embodiment, said light-scattering sheet is disposed in a defined position in a reflecting type liquid crystal display device. Thus, this reflecting type LCD device comprises a liquid crystal cell defined by a juxtaposed set of a transparent front electrode plate comprising a transparent electrode layer and a substrate sheet supporting said conductive layer, a back electrode plate comprising a conductive layer and a substrate sheet supporting said conductive layer, and a liquid crystal hermetically interposed between the conductive layers of said two electrode plates, and as disposed forwardly of said liquid cell, a polarizer. The light-scattering sheet is disposed in at least one of the following positions or modes (i) to (iii).

(i) The light-scattering sheet interposed between the polarizer and the front electrode plate.
(ii) The light-scattering sheet interposed between the back electrode plate and the reflector disposed behind said back electrode plate.
(iii) The light-scattering sheet functioning as a substrate sheet.

In a second embodiment, the liquid crystal display device according to the present invention includes a light-scattering sheet having an isotropic bicontinuous phase structure comprised of a plurality of polymers varying in refractive index.

The present invention is further directed to a method of producing a light-scattering sheet which comprises molding a composition comprising a plurality of polymers varying in refractive index into a sheet and subjecting the sheet to spinodal decomposition to form an isotropic bicontinuous phase structure.

As used in this specification, the term "sheet" means any two-dimensional product regardless of its thickness, thus inclusive of film.

The term "light-scattering sheet having a bicontinuous phase structure" is used herein to include a light-scattering sheet having an intermediate structure between said bicontinuous phase structure and a heterogeneous phase (islands or droplets) structure.

BEST MODE FOR CARRYING OUT THE INVENTION

Light-scattering Sheet

Figure 1:
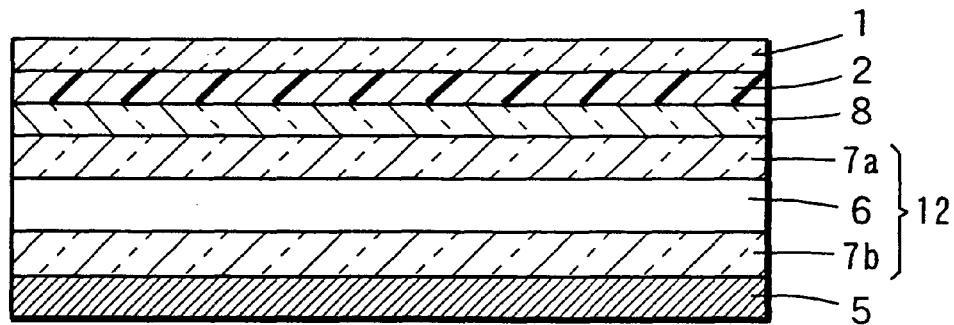
FIG. 1 is a schematic cross-section view showing an example of the liquid crystal display device embodying the present invention.

The light-scattering layer which constitutes the light-scattering sheet (transmitting type light-scattering sheet) is composed of a plurality of polymers differing from each other in refractive index and generally has a phase separation structure (such as the bicontinuous phase structure to be described in detail hereinafter) at the operating temperature (particularly in the neighborhood of room temperature from about 10° to 30° C.). By using such a sheet, the reflected light can be provided with diffusibility and directionality. For enhanced diffusion of light, said plurality of polymers can be used in a combination such that, for example, the difference in refractive index will be about 0.01 to 0.2, preferably about 0.1 to 0.15. When the difference in refractive index is smaller than 0.01, a sheet having a sufficiently high light-diffusing power cannot be obtained. When the difference in refractive index is larger than 0.2, no directionality can be imparted to diffused light.

The polymers can be used in suitable combinations selected from among styrenic resin, (meth)acrylic resin, vinyl ester resin, vinyl ether resin, halogen-containing resin, olefinic resin, polycarbonate resin, polyester-series resin, polyamide-series resin, thermoplastic polyurethane resin, polysulfone resin [e.g. homopolymers of sulfones such as dihalodiphenylsulfones (polyethersulfones), copolymers of said sulfones with an aromatic diol such as bisphenol A (polysulfones), etc.], polyphenylene ether resin (e.g. polymers of phenol compounds such as 2,6-xylenol etc.), cellulose derivative (e.g. cellulose esters, cellulose carbamates, cellulose ethers, etc.), silicone resin (e.g. polydimethylsiloxane, polymethylphenylsiloxane, etc.), rubber or elastomer (e.g. diene rubbers such as polybutadiene, polyisoprene, etc., styrene-butadiene copolymer, acrylonitrile-butadiene copolymer, acrylic rubber, urethane rubber, silicone rubber, etc.) and so on. Usually, the required plurality of polymers can be selected from among styrenic resin, (meth)acrylic resin, vinyl ether-series resin, halogen-containing resin, polycarbonate-series resin, polyester-series resin, polyamide-series resin, cellulose derivative, silicone resin, rubber or elastomer and the like.

The styrenic resin includes homo- or copolymers of styrenic monomers (e.g. polystyrene, styrene-α-methylstyrene copolymer, styrene-vinyltoluene copolymer, etc.) and copolymers of styrenic monomers with other polymerizable monomers (e.g. (meth)acrylic monomers, maleic anhydride, maleimide monomers, dienes, etc.). The styrenic copolymer includes but is not limited to poly(styrene-co-acrylonitrile) (AS resin), copolymers of styrene with (meth)acrylic monomers [e.g. poly(styrene-co-methyl methacrylate), styrene-methyl methacrylate-(meth)acrylate copolymers, styrene-methyl methacrylate-(meth)acrylic acid copolymer, etc.], and styrene-maleic anhydridecopolymer. The preferred styrenic resin includes polystyrene, copolymers of styrene with (meth)acrylic monomers [copolymers comprising styrene and methyl methacrylate as predominant units, such as poly(styrene-co-methyl methacrylate)], AS resin, and poly(styrene-co-butadiene).

The (meth)acrylic resin which can be used includes said homo- or copolymers of (meth)acrylic monomers and copolymers of (meth)acrylic monomers with other copolymerizable monomers. The (meth)acrylic monomers include $C_{1-10}$ alkyl (meth)acrylates such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, 2-ethylhexyl (meth)acrylate, etc.; aryl (meth)acrylates such as phenyl (meth)acrylate etc.; hydroxyalkyl (meth)acrylates such as hydroxyethyl (meth)acrylate, hydroxypropyl (meth)acrylate, etc.; glycidyl (meth)acrylate; N,N-dialkylaminoalkyl (meth)acrylate; and (meth) acrylonitrile; among others. The copolymerizable monomers mentioned above include said styrenic monomers, vinyl ester monomers, maleic anhydride, maleic acid and fumaric acid, to mention a few examples. These monomers can be used singly or two or more of them can be used in a suitable combination.

The (meth)acrylic resin includes, for example, poly(meth)acrylates such as poly(methyl methacrylate), methyl methacrylate-(meth)acrylic acid copolymer, methyl methacrylate-acrylate-(meth)acrylic acid copolymers, methyl methacrylate-(meth)acrylate copolymers and (meth)acrylate-styrene copolymers (MS resin etc.), among others. The preferred (meth)acrylic resin includes poly($C_{1-5}$ alkyl (meth)acrylates) such as poly(methyl (meth)acrylate) etc., particularly methyl methacrylate-based resins predominantly composed of methyl methacrylate (about 50 to 100 weight %, preferably about 70 to 100 weight %).

The vinyl ester-series resin includes homo- or copolymers of vinyl ester monomers (e.g. polyvinyl acetate, polyvinyl propionate, etc.), copolymers of vinyl ester monomers with copolymerizable monomers (e.g. vinyl acetate-vinyl chloride copolymer, vinyl acetate-(meth)acrylate copolymers, etc.), and their derivatives. The derivatives of vinyl ester resin includes polyvinyl alcohol, ethylene-vinyl alcohol copolymer, poly(vinyl acetal) resin and so on.

The vinyl ether-series resin includes homo- or copolymers of vinyl $C_{1-10}$ alkyl ethers such as vinyl methyl ether, vinyl ethyl ether, vinyl propyl ether, vinyl t-butyl ether, etc. and copolymers of vinyl $C_{1-10}$ alkyl ethers with copolymerizable monomers (e.g. vinyl alkyl ether-maleic anhydride copolymers).

The halogen-containing resin includes poly(vinyl chloride), poly(vinylidene fluoride), poly(vinyl chloride-co-vinyl acetate), poly(vinyl chloride-co-(meth)acrylate) and poly(vinylidene chloride-co-(meth)acrylate), among others.

The olefinic resin includes, for example, homopolymers of olefins, such as polyethylene, polypropylene, etc., poly(ethylene-co-vinyl acetate), poly(ethylene-co-vinyl alcohol), poly(ethylene-co-(meth)acrylic acid) and poly(ethylene-co-(meth)acrylate).

The polycarbonate-series resin includes aromatic polycarbonates based on bisphenols (e.g. bisphenol A) and aliphatic polycarbonates such as diethylene glycol bis(allyl carbonate) and so on.

The polyester-series resin includes aromatic polyesters derived from aromatic dicarboxylic acids, e.g. terephthalic acid etc. (homopolyesters such as poly($C_{2-4}$ alkylene terephthalate), e.g. poly(ethylene terephthalate), poly(butylene terephthalate), etc., poly($C_{2-4}$ alkylene naphthalate), etc. and copolyesters containing $C_{2-4}$ alkylene terephthalates and/or $C_{2-4}$ alkylene naphthalates as predominant units (e.g. not less than 50 weight %), etc.) and aliphatic polyesters derived from aliphatic dicarboxylic acids such as adipic acid etc. The polyester resin further includes homo- or copolymers of lactones such as ε-caprolactone etc.

The polyamide-series resin includes aliphatic polyamides such as nylon 46, nylon 6, nylon 66, nylon 610, nylon 612, nylon 11, nylon 12, etc. and polyamides derived from dicarboxylic acids (e.g. terephthalic acid, isophthalic acid, adipic acid, etc.) and diamines (e.g. hexamethylenediamine, m-xylylenediamine, etc.). The polyamide resin includes homo- and copolymers of lactams, e.g. ε-caprolactam, and is not limited to homopolyamides but may be copolyamides.

Referring to the cellulose derivative, the cellulose ester includes, for example, aliphatic organic acid ester ($C_{1-6}$ organic acid esters such as acetylcelluloses such as cellulose diacetate, cellulose triacetate, etc., cellulose propionate, cellulose butyrate, cellulose acetate propionate, cellulose acetate butyrate, etc.), aromatic organic acid esters ($C_{7-12}$ aromatic carboxylic acid esters such as cellulose phthalate, cellulose benzoate, etc.), and inorganic acid esters (e.g. cellulose phosphate, cellulose sulfate, etc.) and may be a mixed acid ester such as, for example, cellulose acetate nitrate. The cellulose derivative further includes cellulose carbamates (e.g. cellulose phenylcarbamate etc.) and cellulose ethers (e.g. cyanoethylcellulose; hydroxy-$C_{2-4}$ alkylcelluloses, e.g. hydroxyethylcellulose, hydroxypropylcellulose, etc.; $C_{1-6}$ alkylcelluloses such as methylcellulose, ethylcellulose, etc.; carboxymethylcellulose and its salt, benzylcellulose, acetylalkylcellulose, etc.).

The preferred polymer includes but is not limited to styrenic resin, (meth)acrylic resin, vinyl ether resin, halogen-containing resin, polycarbonate resin, polyester resin, polyamide resin, cellulose derivative, silicone resin, and rubber or elastomer. Furthermore, the preferred polymer may be a thermoplastic resin having good moldability or film-forming properties and transparency (e.g. styrenic resin, (meth)acrylic resin, etc.).

The glass transition temperature of the polymer can be selected from the range of, for example, about −100° C. to 250° C., preferably about −50° C. to 230° C., more preferably 0° to 200° C. (e.g. about 50° to 150° C.). From the sheet strength and rigidity points of view, at least one of the constituent polymers preferably has a glass transition temperature of not less than 50° C. (for example, about 70 to 200° C.), preferably not less than 80° C. (for example, about 80 to 170° C.). From the standpoint of sheet moldability, the glass transition temperature of the constituent polymer should be up to 250° C. (for example, 70 to 200° C.), preferably not more than 200° C. (for example, 80 to 180° C.).

The weight average molecular weight of the polymer is not particularly restricted but may for example be not more than 1,000,000 (about 10,000 to 1,000,000), preferably about 10,000 to 700,000, more preferably about 10,000 to 50,000.

multi-polymer system including a soft polymer (silicone resin, rubber or elastomer) shows the UCST type compatibility in many instances.

When said plurality of polymers is comprised of 2 kinds of polymers (a first polymer and a second polymer), the combination of the first polymer with the second polymer is not particularly restricted. By way of illustration, when the first polymer is a styrenic resin (e.g. polystyrene, poly (styrene-co-acrylonitrile)), the second polymer may be a polycarbonate resin, a (meth)acrylic resin, a vinyl ether resin, or a rubber or elastomer. Since the temperature dependence of compatibility is dependent on LCST, UCST, glass transition point and polymer molecular weight, among other variables, the proper combination of polymers can be easily selected by experimentation. For reference's sake, a few examples of the polymer combination are shown in Table 1.

TABLE 1

| | First polymer | | | Second polymer | | | Differ- ence in refrac- tive index | Upper/lower critical solution temperature | |
|---|---|---|---|---|---|---|---|---|---|
| | Type | Tg (° C.) | Refractive index | Type | Tg (° C.) | Refractive index | | Type | Temperature (° C.) |
| Ex. 1 | Poly(styrene-co-acrylonitrile) | 100 | 1.57 | Polycarbonate | 150 | 1.59 | 0.02 | LCST | 220 |
| Ex. 2 | Poly(styrene-co-acrylonitrile) | 100 | 1.57 | Poly(methyl methacrylate) | 100 | 1.49 | 0.08 | LCST | 150 |
| Ex. 3 | Polystyrene | 100 | 1.59 | Poly(vinyl methyl ether) | −30 | 1.47 | 0.12 | LCST | 120 |
| Ex. 4 | Polystyrene | 100 | 1.59 | Polyisoprene | −70 | 1.52 | 0.07 | UCST | 180 |

The light-scattering sheet is constituted in a combination of a plurality of polymers showing both compatibility and incompatibility (phase separation) at temperatures not below the glass transition points of the respective polymers. In other words, a plurality of polymers having temperature dependence such that, in a multi-component system thereof, incompatibility (or compatibility) varies with temperature can be used. This temperature dependence of incompatibility (or compatibility) may be whichever of the high-temperature phase separation type (showing compatibility at low temperature and incompatibility at high temperature) (lower critical solution temperature; LCST) system (multi-polymer system or multi-component system) and the low-temperature phase separation type (showing incompatibility at low temperature and compatibility at high temperature) (upper critical solution temperature; UCST) system. The preferred is the LCST phase separation system. By using a plurality of polymers showing such phase separation characteristics, the phase separation structure can be modulated by spinodal decomposition to form a bicontinuous phase structure.

When a plurality of polymers constitute an LCST system or an UCST system, the lower or upper critical solution temperature (critical compatibility/incompatibility temperature) is higher than the ambient temperature of the environment in which the light-scattering sheet is used; for example about 50 to 300° C., preferably about 70 to 250° C., more preferably about 80 to 250° C. (for example, 100 to 220° C.), usually about 80 to 230° C. In this connection, a As a polymer system capable of forming a bicontinuous phase structure, there also is known a polycarbonate resin/poly(methyl methacrylate) system. The LCST type polymer system includes a poly(styrene-co-acrylonitrile) (AS resin)/poly(methyl methacrylate) system, an AS resin/poly(ε-caprolactone) system, a poly(vinylidene fluoride)/isotactic poly(ethyl methacrylate) system, and a poly(methyl methacrylate)/poly(vinyl chloride) system, among others. The UCST type composite polymer system includes a polystyrene/polymethylphenylsiloxane system, a polybutadiene/poly(styrene-co-butadiene) (SBR) system, and AS resin/poly(acrylonitrile-co-butadiene) (NBR) system, among others.

The ratio of the first polymer to the second polymer may for example be (former/latter)=about 10/90 to 90/10 (by weight), preferably about 20/80 to 80/20 (by weight), more preferably about 30/70 to 70/30 (by weight), particularly about 40/60 to 60/40 (by weight). If the constitutional ratio of polymers is excessively biased to one side, one of the polymer phases tends to become discontinuous in the formation of a bicontinuous phase structure by spinodal decomposition, with the consequent failure to impart directionality to the light diffused by the product sheet.

When 3 or more polymers are used to form the light-scattering sheet, the proportion of each polymer can be selected from the range of generally about 1 to 90 weight % (for example, about 1 to 70 weight %, preferably 5 to 70 weight %, more preferably 10 to 70 weight %) based on the total sheet weight.

The above light-scattering layer (light-scattering sheet) has at least a bicontinuous phase structure. The bicontinuous phase structure is sometimes referred to simply as a bicontinuous structure or as a three-dimensionally continuous or conjugated structure and means a structure in which at least 2 kinds of constituent polymer phases are continuous.

In the above light-scattering sheet, it is sufficient that the sheet have at least a bicontinuous phase structure. Thus, the sheet may have a structure such that a bicontinuous phase structure and a droplet phase structure (an independent or isolated phase structure) are intermingled. In the spinodal decomposition, with the progress of phase separation, the polymers form a bicontinuous phase owing to surface tension and on further heating, the bicontinuous phase becomes discontinuous owing to its own surface tension to assume a liquid droplet structure (an islands-in-an ocean structure consisting of independent beads or spheres). Therefore, according to the degree of phase separation, an intermediate structure between a bicontinuous phase and a droplet structure, that is to say a meso-phase structure corresponding to a transition from said bicontinuous phase to said droplet phase can be formed. In the context of the present invention, the above intermediate structure, not the genuine droplet structure (consisting of independent or isolated generally spherical phases), is also subsumed in the concept of bicontinuous phase structure.

The above-mentioned bicontinuous phase structure is substantially isotropic, with anisotropy having been diminished, within the sheet plane. The term "isotropy" means that the size of continuous phase separation (average interphase distance) is uniform in all directions within the sheet plane.

When the phase structure of the light-scattering sheet is a composite structure composed of a bicontinuous phase and a droplet (islands) structure, the proportion of the droplet phase (isolated polymer phase) may for example be not more than 30% (by volume), preferably not more than 10% (by volume). The two-dimensional or three-dimensional configuration of the bicontinuous phase structure is not particularly restricted but may be a network structure, particularly a random network structure.

The bicontinuous phase structure and the intermediate structure usually have a regularity of interphase distance (the distance between identical phases). Because of this, the light incident on the sheet gives a scattered light directed in a specific direction due to Bragg reflection. Therefore, even when the sheet is built into a reflecting type liquid crystal display device, the diffuse light can be directed in a given direction (directed diffusion) to remarkably brighten the display screen so that the trouble which could not be overcome with the conventional particle-dispersion type transmitting diffusion sheet, that is an imaging of the light source (e.g. a fluorescent tube) on the panel, can be avoided.

Furthermore, in the light-scattering sheet, the average interphase distance of the bicontinuous phase may for example be about 1 to 20 $\mu$m, preferably about 2 to 15 $\mu$m, more preferably about 2 to 10 $\mu$m. When the average interphase distance is too small, the distribution of diffuse light comes closer to the Gaussian distribution so that the directionality cannot be imparted. On the other hand, when the average interphase distance is too large, the direction of diffused light more or less coincides with the direction of linearly advancing light so that the diffusibility of light is decreased.

Incidentally, the interphase distance can be measured by image processing of a photomicrogram (e.g. a confocal laser microscopic picture). An alternative method comprises measuring the diffusion angle $\theta$ giving a maximal intensity of diffuse light by the same procedure as that for evaluating the directionality of diffuse light which will be described hereinafter and calculating the interphase distance d from the following Bragg reflection equation.

$$2d \cdot \sin(\theta/2) = \lambda$$

(wherein d denotes an interphase distance, $\theta$ denotes an angle of diffusion, and $\lambda$ denotes a wavelength of light).

The thickness of the light-scattering sheet may for example be about 1 to 500 $\mu$m, preferably about 1 to 300 $\mu$m (about 10 to 150 $\mu$m, for example about 10 to 100 $\mu$m), more preferably about 3 to 100 $\mu$m (for example, 5 to 50 $\mu$m, particularly 10 to 50 $\mu$m). When the thickness of the sheet is too small, the intensity of diffused light is decreased. When the sheet is too thick, diffusibility is so great that directionality is sacrificed. Moreover, when the sheet is applied to a reflecting type liquid crystal display device, the device thickness and weight are increased and the displayed image definition is decreased. When the difference in refractive index between the constituent polymers is small, the sheet thickness is preferably relatively large, and when the difference in refractive index is large, the sheet thickness is preferably relatively small.

As will be described in detail hereinafter, when the light-scattering sheet is constituted of a substrate sheet and a light-scattering layer, the thickness of the light-scattering layer may for example be about 1 to 100 $\mu$m, preferably about 5 to 60 $\mu$m, more preferably about 10 to 40 $\mu$m.

Figure 2:
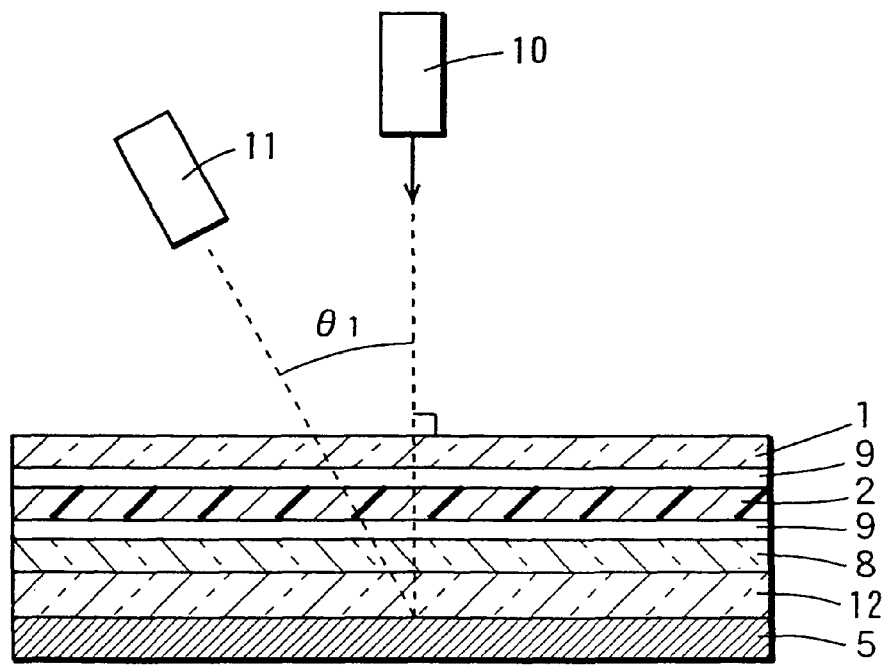
FIG. 2 is a schematic diagram explaining the method for evaluating the directionality of a light-scattering sheet.

When a light-scattering sheet of the above bicontinuous phase structure is used, not only high light diffusibility can be obtained but a high order of directionality can be imparted to diffused light. The directionality of diffused light can be measured, for example, by using a reflecting type LCD model device comprising a polarizer plate 1, a vinyl acetate (self-)adhesive 9, a light diffuser sheet 2, a color filter 8, a glass sheet (thickness: 1 mm) 12 and an aluminum reflector 5 as laminated as illustrated in FIG. 2. Thus, by illuminating this reflecting type LCD model device perpendicularly from the front side using a laser beam illuminator (Nihon Kagaku ENG NEO-20 MS) 10, the intensity distribution of reflected light (the distribution of diffuse light) corresponding to the diffusion angle $\theta$1 is measured. With a light-scattering sheet of the bicontinuous phase structure, in contrast to a light-scattering sheet showing a Gaussian distribution of reflected light centered around $\theta$1=0°, an intense maximum distribution is obtained in the directed direction (for example, $\theta$1=1 to 60° (e.g. 1 to 30°), preferably 3 to 60° (for example, 3 to 20°), more preferably 5 to 20°). Therefore, a bright LCD image can be obtained over a wide viewing angle.

The transparency (total light transmittance) of the light-scattering sheet may for example be about 70 to 100%, preferably about 80 to 100%, more preferably about 90 to 100%. The total light transmittance can be measured with a hazemeter (NDH-300A available from Nippon Denshoku Kogyo Co. Ltd.).

Figure 3:
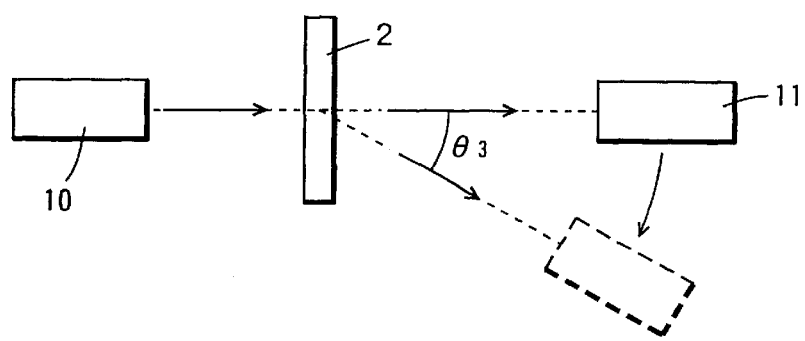
FIG. 3 is a schematic diagram explaining the method of measuring the intensity of linearly transmitted light and that of diffuse transmitted light of a light-scattering sheet.

Among said light-scattering sheets, the particularly preferred light-scattering sheet is comprised of a plurality of polymers having herein-defined weight average molecular weights [for example, not more than 300,000 (about 10,000 to 300,000), preferably about 10,000 to 150,000, more preferably about 10,000 to 120,000]. The speed of formation (expression speed) of a bicontinuous phase by spinodal decomposition is determined by the diffusion of molecular chains and, therefore, the objective bicontinuous phase can be quickly obtained by using polymers having the defined molecular weights. Moreover, the intensity of diffuse light can be increased relative to the intensity of linear light. As a result, the ambient light can be effectively taken in and the light incident from the surroundings can be effectively scattered. Therefore, a bright screen with an improved visibility of the liquid crystal image can be obtained. FIG. 3 is a schematic diagram explaining the method of measuring the intensity of diffuse light. Thus, from a laser beam illuminator (Nihon Kagaku ENG NEO-20 MS) 10 installed behind the light-scattering sheet 2, a laser beam is projected against the light-scattering sheet 2. The laser beam is diffused by the light-scattering sheet 2 and emerges from the front side of the light-scattering sheet. By detecting this diffused light (diffuse transmitted light) corresponding to the diffusion angle θ3 with a detector 11, the intensity of the diffuse light can be determined. When the light-scattering sheet is made of polymers having the defined weight average molecular weights, the ratio of the intensity I (θ0) of linearly transmitted light (θ3=0°) to the maximum intensity I (θmax) of diffuse transmitted light, i.e. I (θ0)/I (θmax), may for example be about 3000/1 to 1/1, preferably about 500/1 to 1/1, more preferably about 100/1 to 5/1.

The light-scattering sheet may be exclusively comprised of a light-scattering layer or, where necessary, may be a laminate of the laminar with a substrate sheet or film (a transparent support). The strength of the sheet can be increased by lamination with a transparent substrate sheet.

As the resin for constituting the substrate sheet (transparent support), resins similar to those mentioned for the formation of the light-scattering layer can be employed. Moreover, when a substrate sheet is used for supporting a transparent light-scattering layer which is to have said bicontinuous phase structure formed by spinodal decomposition, the substrate sheet, too, is preferably thermally stable against the spinodal decomposition temperature. The preferred substrate sheet includes sheets obtainable from, among others, a cellulose derivative (e.g. acetylcellulose such as cellulose triacetate (TAC), cellulose diacetate, etc.), (meth)acrylate resin, vinyl ester resin (e.g. polyvinyl alcohol), polyester resin (e.g. poly(ethylene terephthalate) (PET), poly(butylene terephthalate) (PBT), etc.), polyarylate resin, polysulfone resin (e.g. polysulfone, polyethersulfone (PES), etc.), polyether ketone resin (e.g. polyether ketone (PEK), polyether ether ketone (PEEK), etc.), polycarbonate-series resin (e.g. polycarbonate (PC) etc.), polyolef in-series resin (e.g. polyethylene, polypropylene, etc.), cyclic polyolefin resin (Arton, Zeonex, etc.), styrenic resin (e.g. polystyrene etc.), and halogen-containing resin (e.g. poly (vinylidene chloride) etc.), among others. These sheets may have been uniaxially oriented or biaxially oriented, and may for example be an oriented polyester sheet such as a uniaxially oriented PET sheet or a biaxially oriented PET sheet.

The light-scattering sheet (or substrate sheet) mentioned above may be a sheet having a thermal expansion coefficient comparable to that of the polarizer and optical retardation sheet which are used for color rendition and/or elaboration of the liquid crystal image. In liquid crystal display devices, the polarizer and optical retardation sheet are often laminated with the light-scattering sheet and, therefore, by designing the thermal expansion coefficient of the light-scattering sheet to be substantially equal to the thermal expansion coefficients of the polarizer and optical retardation film, the delamination of the light-scattering sheet (or substrate sheet) from the polarizer and optical retardation film on thermal expansion or shrinkage can be prevented. When the polarizer and optical retardation film are formed of a cellulose derivative or derivatives, for instance, cellulose derivatives (e.g. cellulose acetate) are preferably used as the resin for formation of the light-scattering layer or the substrate sheet.

Moreover, since an optical retardation sheet is often used in the liquid crystal display device (the STN LCD device in particular), it is convenient to use a light-scattering sheet with a low retardation value. For example, a light-scattering sheet giving an R (retardation) value of not more than 50 nm, preferably not more than 30 nm, according to the following equation can be employed. A light-scattering sheet with such a low retardation value can be produced using polyethersulfone (PES) or cellulose triacetate (TAC) as the resin for constituting the light-scattering layer or the substrate sheet.

$$R = \Delta n \times d$$

(where $\Delta n$ represents the birefringence of a sheet and $d$ represents the thickness of the sheet)

Where necessary, even a light-scattering sheet having an optical retardation can be used. For example, when a light-scattering sheet is formed using a substrate sheet having an optical retardation (for example, a uniaxially stretched PET sheet), the light-scattering sheet has a retardation. Furthermore, when a resin composition is cast into a sheet and subjected to spinodal decomposition for the formation of a bicontinuous phase structure, the resulting light-scattering film may have a retardation value in some cases. Even in such cases, disturbances on the display screen can be prevented by causing the orientation axis of the light-scattering sheet to coincide with the polarizing axis of the polarizer.

The light-scattering sheet may contain a variety of additives, such as a stabilizer (e.g. antioxidant, ultraviolet absorber, heat stabilizer, etc.), plasticizer, colorant (a dye or a pigment), flame retardant, antistatic agent and surfactant. Moreover, where necessary, the surface of the light-scattering sheet may be formed with various coating layers, such as an antistatic layer, an antifogging layer and a parting (release) layer.

[Method of Producing a Light-scattering Sheet]

The light-scattering sheet having said bicontinuous phase structure can be produced by casting or otherwise molding a composition (particularly a resin composition) comprising a plurality of component materials varying in refractive index into a sheet or constructing a layer of said composition by a coating or other technique on the surface of a substrate sheet (transparent substrate sheet). The resin composition mentioned above can be maintained in a non-consolute state at room temperature but undergoes phase separation dependent on temperature.

More particularly, a light-scattering sheet having said bicontinuous phase structure can be produced by molding a resin composition comprising a plurality of polymers varying in refractive index into a sheet in the conventional manner, subjecting the sheet to spinodal decomposition, and immobilizing the induced isotropic phase separation structure (bicontinuous phase structure). As an alternative, such a sheet can be produced by applying a resin composition comprising a generally uniform dispersion of said plurality of polymers onto the surface of a substrate sheet by coating or a melt-lamination technique, if necessary followed by drying, and subjecting the resulting coated sheet or laminate to spinodal decomposition.

The sheet-forming technology that can be used includes a casting or coating method which comprises casting or coating a solution (or a slurry) of said polymer composition or an extrusion method which comprises melt-kneading said polymer composition at a temperature not below its glass transition temperature and extruding the melt from a T-die or the like into a sheet (T-die process, inflation process).

The spinodal decomposition can be carried out by heating said resin composition (or sheet) comprising polymers varying in refractive index to a temperature not below the glass transition temperatures of the polymers for phase separation. For example, in case said resin composition shows an LCST type phase separation characteristic, there can be mentioned the method which comprises heating the resin composition layer (or sheet) at a temperature not below the lower critical solution temperature (LCST), for example a temperature higher than LCST by about 10 to 100° C., preferably about 20 to 80° C., and in case said resin composition shows a UCST type phase separation characteristic, there can be mentioned the method in which said resin composition layer (or sheet) is subjected to heat treatment and sonication at a temperature not over the upper critical solution temperature (UCST), for example at a temperature lower than UCST by about 10 to 50° C., preferably about 20 to 40° C. The temperature of heat treatment can be selected from the range of, for example, about 80 to 380° C., preferably about 140 to 300° C. In this spinodal decomposition, as phase separation progresses, the component polymers form a bicontinuous phase structure due to surface tension and as heating is further continued, the continuous phase becomes discontinuous under its own surface tension to assume a droplet phase structure (an insular phase consisting of independent bead-like or spherical islands). Therefore, depending on the degree of phase separation, an intermediate structure between said bicontinuous phase structure and droplet phase structure, namely a transitional mesophase structure from said bicontinuous phase structure to said droplet phase structure can also be formed.

As the sheet thus converted to an isotropic bicontinuous phase structure by spinodal decomposition is cooled to a temperature below the glass transition points of the component polymers (for example, a temperature below the glass transition temperature of the main polymer), the bicontinuous phase structure is immobilized or fixed. In cooling an LCST type sheet, the sheet is preferably quenched (for example, by quenching with cold water at a temperature not higher than 30° C., preferably not higher than 10° C.).

Since the above technology utilizes spinodal decomposition, a sheet having a bicontinuous phase structure can be produced at low cost by a simple procedure, i.e. heating and cooling.

[Light-scattering Composite Sheet]

The light-scattering composite sheet according to the present invention comprises a light-scattering sheet comprising a light-scattering layer and, as superposed or laminated on at least one side thereof, one or more other functional layers (e.g. polarizer, phase plate, reflector and transparent conductive layer). When a light-scattering sheet is so laminated to provide a light-scattering composite sheet, this composite sheet can be used in lieu of the corresponding conventional functional layer or layers so that the light-scattering sheet can be expediently built into the liquid crystal display device. Thus, a high-luminance, sophisticated reflecting type liquid crystal display device can be manufactured without modifying the existing LCD device production line, without incurring an increase in production cost, and without sacrificing the yield. Moreover, as will be further described hereinafter, the use of such a composite sheet enables disposition of a light-scattering sheet in proximity with the liquid crystal to improve the visibility of the image displayed.

The composite sheet specifically includes binary laminates such as a laminate of the light-scattering sheet with a polarizer, a laminate of the light-scattering sheet with an optical retardation film, a laminate of the light-scattering sheet with a reflector and a laminate of the light-scattering sheet with a transparent conductive layer and ternary laminates obtainable on further lamination of such binary laminates with a functional layer functionally distinct from the component layers of said binary laminates (for example, a ternary laminate sheet composed of the light-scattering sheet, a polarizer and an optical retardation film, particularly a sheet made by laminating a polarizer, the light-scattering sheet and an optical retardation film in the order mentioned and a sheet made by laminating a polarizer, an optical retardation film and the light-scattering sheet in the order mentioned, with the polarizer being disposed on the surface of the ternary structure). Particularly when the liquid crystal display device (for example, the STN liquid crystal display device) is assembled using such a ternary laminate sheet, the operation of laminating the various functional layers in the manufacture of the LCD device can be omitted.

As the light-scattering sheet for use in such a composite sheet, a light-scattering sheet having said bicontinuous phase structure is used in many instances but this is not an exclusive choice inasmuch as the sheet has a light-scattering layer provided with a phase separation structure composed of a plurality of solid components (e.g. resin and inorganic components) which vary in refractive index. Thus, for example, it may be a light-scattering sheet having a particle-dispersion structure. In this connection, the difference in refractive index between at least two of said plurality of components forming the phase separation structure (e.g. said particle dispersion structure) should be similar to the difference in refractive index between the plurality of polymers constituting said bicontinuous phase structure. Even such a light-scattering sheet, when used in the form of a composite sheet, contributes to an improved visibility of the image displayed as will be described hereinafter.

As the resin component mentioned above, resins similar to those constituting said bifunctional phase structure can be used.

As the inorganic component, there can be used transparent or translucent inorganic materials, e.g. inorganic oxides such as silicon oxide (e.g. glass, particularly alkali-free glass), zirconium oxide, aluminum oxide, zinc oxide, mica, etc.; inorganic nitrides such as boron nitride; and inorganic halides such as calcium fluoride, magnesium fluoride, etc.; among others. These inorganic materials may be used in a combination of 2 or more species and a composite material comprised of mica and boron nitride may be mentioned as an example.

The light-scattering layer of said particle dispersion structure is comprised of, for example, a transparent base resin (e.g. a transparent base resin comprised of said resin component) and a particulate component (e.g. a fine powder comprised of said resin component or inorganic component) which are different from each other in refractive index. The particulate component exists as dispersed in said transparent base resin.

The preferred examples of said transparent base resin and said resin constituting said particulate component include styrenic resin (e.g. polystyrene), (meth)acrylic resin, olefinic resin (e.g. polyethylene, polypropylene), vinyl ester resin, vinyl ether resin, polycarbonate resin, polysulfone resin, polyamide resin (e.g. nylon 6, nylon 12, nylon 612) and cellulose derivative (e.g. cellulose acetate), among others.

While the particle dispersion structure shows a high light-scattering performance, there are cases in which it shows a light-scattering characteristic such that the scattering power declines with an increasing diffusion angle. Thus, because the distribution of diffuse light is close to the Gaussian distribution, the intensity of scattered light decreases on the whole as the diffusion angle is increased, with the result that the brightness of the display is sometimes decreased. Therefore, the difference in refractive index between the transparent base resin and the particulate component (e.g. a resin powder or an inorganic powder), the particle size, proportion and powder density of the particulate component may be judiciously adjusted to suppress backward scattering (scattered reflection) and impart directionality to diffused light (diffuse transmitted light). When a sheet having a directionality corresponding to the required visual field characteristic is to be used, the source of ambient light as well as a front light source can be efficiently exploited.

For imparting said directionality, the difference in refractive index between the particulate component and the transparent base resin may for example be about 0.01 to 0.06, preferably about 0.01 to 0.05, more preferably about 0.01 to 0.04.

The mean particle diameter of said particulate component may for example be about 0.1 to 100 $\mu$m, preferably about 1 to 20 $\mu$m.

The ratio of the particulate component to the transparent base resin may for example be (former/latter)=about 10/90 to 90/10 (by weight), preferably about 15/85 to 60/40 (by weight), more preferably about 15/85 to 40/60 (by weight).

The mean particle density of said particulate component may for example be about 1 to 100 ($10^{10}$/cm$^3$), preferably about 4 to 80 ($10^{10}$/cm$^3$).

The mean particle density can be found, for example by measuring the mean particle diameter and applying the following equation (I).

$$\text{Mean particle density (particles/cm}^3\text{)} = 1 \text{ cm}^3 \times Vs/[(4/3)\pi(Ds \times 10^{-4}/2)^3] \quad (I)$$

(where Vs represents the proportion (by volume) of the particulate component in a light-scattering layer, $\pi$ represents the circular constant, and Ds represents the particle diameter ($\mu$m) of the particulate component)

The light-scattering sheet for use in the composite sheet, like said light-scattering sheet having a bicontinuous phase structure, may be exclusively constituted of a light-scattering layer or a laminar assembly of a light-scattering layer with a substrate sheet (transparent support). This substrate sheet may be the same as the substrate sheet of said light-scattering sheet having a bicontinuous phase structure.

The thickness of the light-scattering sheet as a constituent of the composite sheet may also be of the same order as the thickness of said light-scattering sheet having a bicontinuous phase structure.

The light-scattering sheet for use as a constituent of said composite sheet, like said light-scattering sheet having a bicontinuous phase structure, may be a sheet having a thermal expansion coefficient of the same order as that of said polarizer and optical retardation film. When the light-scattering sheet is laminated to a polarizer or an optical retardation sheet to form a composite sheet, the delamination of the composite sheet on thermal expansion or shrinkage can be prevented by designing the thermal expansion coefficient of the light-scattering sheet to be substantially equal to the thermal expansion coefficient of the polarizer and optical retardation sheet. Moreover, even when a transparent conductive sheet is used as a constituent of the composite sheet (a composite of the light-scattering sheet with a transparent conductive layer), the transparent conductive sheet is generally laminated to the polarizer and phase sheet in LCD devices, so that the delamination of the transparent conductive sheet from the polarizer and optical retardation film can be prevented.

The composite sheet or the light-scattering sheet as a constituent of the composite sheet is preferably small in retardation as it is the case with said light-scattering film having a bicontinuous phase structure, although it may have a retardation.

A light-scattering sheet having said particle dispersion structure can be produced from a mixture of said transparent base resin and particulate component by the conventional molding technology, for example by casting or melt-extrusion. The sheet can also be produced by the solution molding method in which said transparent base resin and particulate component are molded in solution but the preferred is the melt-molding method in which a dispersion of the particulate component in a molten mass of the transparent base resin is molded into a sheet. By the melt-molding method, the objective sheet can be produced at low cost.

A light-scattering sheet having said particle dispersion structure can also be produced by coating the surface of a substrate sheet with a mixture of said transparent base resin and particulate component.

As the polarizer, optical retardation sheet and reflector, the conventional polarizer, optical retardation sheet and reflector for use in liquid crystal display devices can be used as they are. For example, the polarizer may be a polyvinyl alcohol film. The optical retardation film may for example be a polycarbonate retardation film or sheet. The reflector may for example be a plastic film carrying a metal foil (e.g. aluminum foil) or a vapor-deposited metal (e.g. aluminum) layer. The reflector may be a specular reflection type reflector or a light-scattering reflector (e.g. a reflector with a roughened surface).

The transparent electrically conductive layer constituting said transparent conductive sheet may for example be a layer constituted of an electrically conductive inorganic compound, for example a metal oxide layer (e.g. ITO (indium tin oxide), $InO_2$, $SnO_2$, $ZnO$ and other layers) or a metal layer (e.g. Au, Ag, Pt, Pd and other layers). The preferred transparent conductive layer is an ITO layer.

The thickness of the transparent conductive layer may for example be about $100 \times 10^{-8}$ to $2,000 \times 10^{-8}$ cm, preferably about $100 \times 10^{-8}$ to $1,500 \times 10^{-8}$ cm, more preferably about $150 \times 10^{-8}$ to $1,000 \times 10^{-8}$ cm.

The surface resistivity of the transparent conductive layer may for example be 10 to 1,000$\Omega$/□, preferably 15 to 500$\Omega$/□, more preferably 20 to 300$\Omega$/□.

When the light-scattering sheet is comprised of a light-scattering layer and a substrate sheet, the transparent conductive layer may be formed either on the light-scattering layer side of the light-scattering sheet or on the substrate sheet side thereof. When the transparent conductive layer is formed on the light-scattering layer side, the light-scattering layer can be located in close proximity with the liquid crystal layer so that a display panel of high image quality can be constructed. On the other hand, when the transparent conductive layer is formed on the substrate sheet side, the reliability of the liquid crystal display device is enhanced. Thus, when the liquid crystal display device to be described hereinafter is formed using a transparent conductive sheet, it is necessary to provide an alignment film on the transparent conductive sheet or form an adhesive layer on the light-scattering sheet, which requires a heat treatment of the transparent conductive sheet at a high temperature. When the transparent conductive layer is formed on the substrate sheet side, the reliability (stability) of the liquid crystal display device can be increased because the heat resistance of the substrate sheet is high. (For example, the glass transition temperatures of PES and PC are about 224° C. and about 145° C., respectively and, in addition, the crystallinity of PET is high, while the heat resistance of TAC is high.)

Furthermore, because the transparent conductive sheet need only be formed with the transparent conductive layer on at least one side of the light-scattering sheet, the other surface may be left untreated or formed with a layer other than the transparent conductive layer, such as an antistatic layer for eliminating the static charge of the sheet. When such an antistatic layer is formed, static electricity can be effectively removed in the step of laminating a polarizer, an optical retardation sheet and a reflector to this layer so that degradation of the liquid crystal display device can be prevented.

The antistatic layer can be formed of the same material as that of said transparent conductive layer. The thickness of the antistatic layer may for example be about 10 to 500 Angstrom units (Å), preferably about 30 to 300 Å. The surface resistivity of the antistatic layer may for example be about 0.5 to 100 kΩ/□, preferably about 1 to 50 kΩ/□.

Despite the formation of the conductive layer, the transparent conductive sheet shows a high total light transmittance comparable to that of said light-scattering sheet. For example, the total light transmittance value is about 70 to 100%, preferably about 85 to 98%, more preferably about 90 to 95%.

Like said light-scattering sheet having a bicontinuous phase structure, the composite sheet may contain a variety of additives.

The surface of the composite sheet (in the case of a transparent conductive sheet, particularly the surface not formed with a transparent conductive layer) may optionally be formed with various coating layers such as an antifogging layer and a parting layer.

The thickness of the composite sheet can be judiciously selected with reference to the thickness of the functional layer. For example, because of the very small thickness of the transparent conductive layer, the thickness of the transparent conductive sheet is similar to the thickness of the light-scattering sheet, thus being about 1 to 500 μm, preferably about 10 to 400 μm, more preferably about 50 to 200 μm. When the thickness of the transparent conductive sheet exceeds 500 μm, the sharpness of the image formed is decreased (blurred image). When the thickness of the transparent conductive sheet is less than 1 μm, the strength and handlability of the sheet are decreased.

The composite sheet may be capable of directing diffuse light in a diffusing angle range of about 3 to 60° preferably about 5 to 50°, more preferably about 10 to 40° (particularly about 10 to 30° C.).

[Method of Producing a Light-scattering Composite Sheet]

When the light-scattering composite sheet is constituted as a composite sheet composed of a light-scattering sheet and a functional layer or layers other than a transparent conductive layer, namely a polarizer, an optical retardation film and a reflector, the objective composite sheet can be fabricated by applying a adhesive to either said light-scattering sheet or said functional layer and joining them together. For example, the composite sheet can be produced by forming a adhesive layer on one side of the light-scattering sheet and laminating the functional layer (polarizer, optical retardation sheet, reflector, etc.) on that side.

The self-adhesive that can be used for this purpose includes but is not limited to (meth)acrylic resin, vinyl acetate resin, silicone-series polymer, polyester, polyurethane and synthetic rubber.

The (meth)acrylic resin for said acrylic adhesive may for example be a homo- or copolymer of a (meth)acrylic ester (e.g. the ester of an alcohol containing about 2 to 14 carbon atoms, such as ethyl alcohol, n-propyl alcohol or isopropyl alcohol with (meth)acrylic acid).

To facilitate lamination of the composite sheet in the LCD device production line, said self-adhesive may be coated onto the surface of the composite sheet (for example, the surface of the light-scattering sheet which does not come into contact with the functional layer). Furthermore, as it is the case with functional sheets in general, a parting film may be provided on the surface of the adhesive layer.

The surface of the functional layer of the composite sheet may be protected with a protective film.

On the other hand., the transparent conductive sheet can be obtained by forming a transparent conductive layer on the surface of the light-scattering sheet using a suitable conventional technique, such as sputtering, vacuum vapor deposition, ion plating or coating. When the transparent conductive layer is to be formed by the vacuum vapor deposition technique (e.g. ITO vapor deposition), the vapor deposition is usually preceded by the vapor deposition of a non-conductive inorganic compound, such as $SiO_2$, on the surface of the light-scattering sheet or formation of an anchor coating layer using a heat-curable or UV-curable resin, for instance, on said surface. Such a pretreatment contributes to improvements in the strength and durability of the transparent conductive layer.

[Reflecting Type Liquid Crystal Display Device]

The reflecting type liquid crystal display device of the present invention comprises a liquid crystal cell defined by a transparent front electrode plate comprising a transparent conductive layer (electrode) and a substrate sheet supporting said transparent conductive layer (electrode-supporting substrate) and a back electrode plate comprising a conductive layer (electrode) and a substrate sheet supporting said conductive layer (electrode-supporting substrate) as disposed in juxtaposition, a liquid crystal hermetically sealed between the two electrode plates, and a polarizer disposed forwardly of said liquid crystal cell. Usually, a light reflector is disposed behind the back electrode plate and said polarizer is disposed within the path of light incident from the front direction and the path of reflected light. In the present invention, for improved image visibility of the liquid crystal display device, the light-scattering sheet (the light-scattering sheet for said composite sheet, for example a light-scattering sheet having a bicontinuous phase structure or a light-scattering sheet having a particle dispersion structure) is used to construct the liquid crystal display device. More particularly, the liquid crystal display device has said light-scattering sheet in at least one of the following positions or modes (i) to (iii).

(i) the light-scattering sheet interposed between the polarizer and the front electrode plate;

(ii) the light-scattering sheet interposed between the back electrode plate and the reflector disposed behind said back electrode plate; and (iii) the light-scattering sheet functioning as said substrate sheet.

In such a reflecting type liquid crystal display device, the light-scattering sheet can be disposed in close proximity with the liquid crystal so that image blurring can be prevented to improve the image visibility. Moreover, since the light-scattering sheet is not exposed on the surface of the reflecting type liquid display device, it is not liable to be affected mechanically or chemically due to external causes so that the light-scattering layer is protected against marring. In addition, since a durable polarizer is formed on the surface of the reflecting type liquid crystal display device, the quality of the device can be maintained for a long period of time.

For example, FIG. 1 is a schematic cross-section view showing the color liquid crystal display device in the mode (i) where the light-scattering sheet is interposed between the polarizer and the liquid crystal cell. The reflecting type LCD device shown in FIG. 1 comprises a liquid crystal cell 12 comprising a liquid crystal layer 6 sealed between a pair of transparent electrode plates (e.g. glass sheets) 7a, 7b having transparent conductive layers (not shown) and, as laminated on one 7b of said transparent electrode plates (back electrode plate), a reflector 5 for reflecting incident light (e.g. a specular or other reflection layer). Furthermore, on the other transparent electrode plate 7a (front electrode plate) defining the liquid crystal cell 12, there is a light-scattering sheet (in this example, a light-scattering sheet having a bicontinuous phase structure) 2 laminated through a color filter 8 for color display. In addition, a polarizer 1 for polarizing reflected light is laminated on the other side of the light-scattering sheet 2. When the reflecting LCD device is used for monochromatic display, said color filter is not indispensable.

When the light-scattering sheet is interposed between the polarizer and transparent conductive layer, not only the light incident from the viewer's front side (incident light) can be diffused (scattered) but also the light reflected by the reflector 5 can be diffused (rescattered). Since the light is thus scattered twice, the specular reflection from the reflector 5 can be sufficiently precluded.

Figure 7:
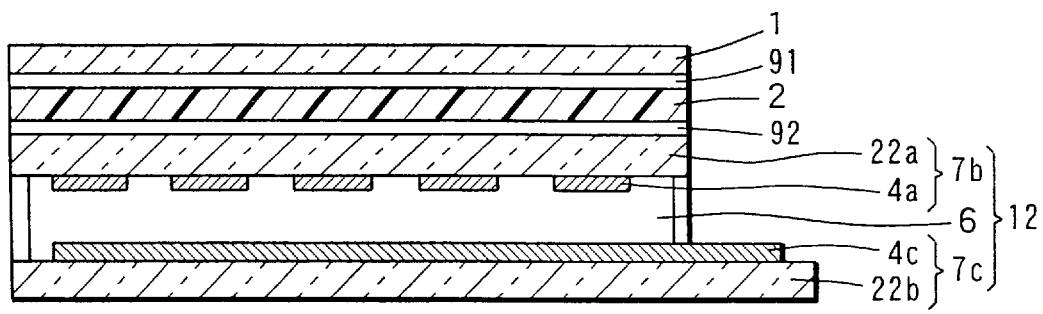
FIG. 7 is a schematic cross-section view showing another example of the liquid crystal display device according to the present invention.

When the light-scattering sheet is interposed between the polarizer and transparent conductive layer, the reflector is not necessarily essential inasmuch as the incident light can be reflected behind the liquid crystal. Thus, for example, the conductive layer of the back electrode plate may be constituted as a light reflective conductive layer (for example, a glass sheet carrying a vapor-deposited metal layer). FIG. 7 is a schematic cross-section view showing a liquid crystal display device equipped with such a reflective conductive layer. This liquid crystal display device has a liquid crystal cell 12 comprising a front electrode plate 7a composed of a transparent front electrode (a transparent conductive layer such as an indium tin oxide thin film) 4a and a front substrate (e.g. a 1 mm-thick glass sheet) 22a, a back electrode plate 7c composed of a back electrode (conductive layer) 4c and a back substrate (e.g. a 1 mm-thick glass sheet) 22b, and a liquid crystal layer 6 hermetically interposed between said two electrode plates 7a, 7c. The back electrode (conductive layer) 4c is a light reflective back electrode fabricated using an aluminum thin film. On the front side of the liquid crystal cell 12 is a light-scattering sheet 2 laminated through a self-adhesive layer 92, and a polarizer 1 has been laminated on the surface of said light scattering sheet 2 through a self-adhesive layer 91. By constructing a reflecting type liquid crystal device using a reflective back electrode, the liquid crystal device can be reduced in thickness.

Figure 9:
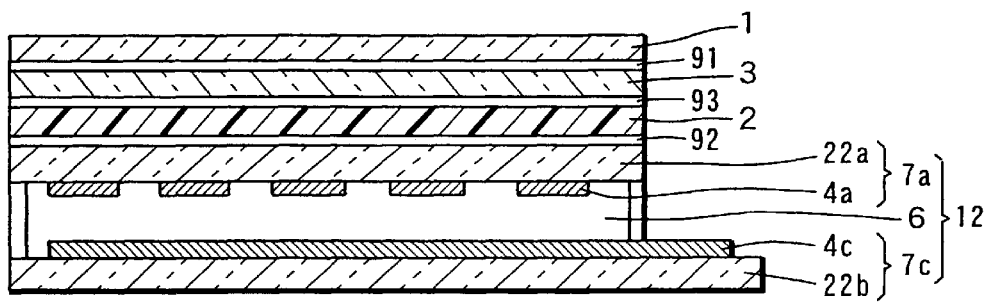
FIG. 9 is a schematic cross-section view showing a still another example of the liquid crystal display device according to the present invention.

A phase plate or an optical retardation film may be interposed between the polarizer and the front electrode plate in an STN (super twisted nematic) liquid crystal display device, though this is not indispensable in a TFT liquid crystal display device. As regards the optical retardation film, the light-scattering sheet may be interposed between the polarizer and the optical retardation film but can be advantageously interposed between the optical retardation film and the front electrode plate (or the liquid crystal cell). By way of illustration, FIG. 9 is a schematic cross-section view showing a liquid crystal display device equipped with a light-scattering sheet interposed between the optical retardation film and the front electrode plate. The liquid crystal display device illustrated in FIG. 9 can be constructed by laminating a light-scattering sheet 2 on the front electrode plate 7a of a liquid crystal cell 12 similar to the one shown in FIG. 7 through a self-adhesive layer 92, laminating an optical retardation film 3 on the surface of said light-scattering sheet 2 through a self-adhesive layer 93, and further laminating a polarizer 1 on the surface of said optical retardation film 3 through a self-adhesive layer 91. When the light-scattering sheet 2 is interposed between the optical retardation film 3 and the front electrode plate 7a, as compared with the arrangement of interposing the light-scattering sheet 2 between the polarizer 1 and the optical retardation film 3, the light-scattering sheet can be brought closer to the liquid crystal so that the clarity and definition of the image can be further improved.

Figure 11:
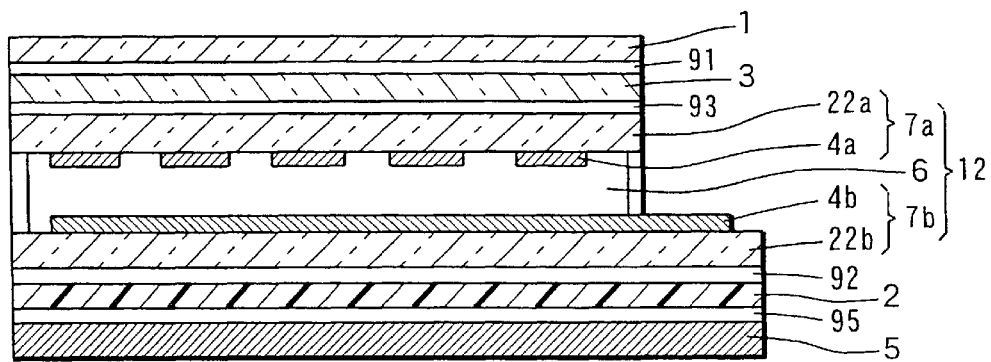
FIG. 11 is a schematic cross-section view showing a further example of the liquid crystal display device according to the present invention.

FIG. 11 is a schematic cross-section view showing a liquid crystal display device in mode (ii) wherein the light-scattering sheet is interposed between the back electrode plate and the reflector. This liquid crystal display device has a liquid crystal cell 12 comprising a front substrate sheet (e.g. a 100 μm-thick plastic sheet) 22b, a back substrate sheet (e.g. a 100 μm-thick plastic sheet) 22b and a liquid crystal layer 6 interposed hermetically between the two substrate sheets. The above substrate sheets have respective transparent front electrodes (e.g. indium tin oxide thin films) 4a, 4b formed on the surfaces in contact with the liquid crystal. Disposed rearwardly of the liquid crystal cell 12 is a reflector 5 carrying a self-adhesive layer 95, and a light-scattering sheet 2 is laminated through a self-adhesive layer 92 between said reflector 5 and liquid crystal cell 12. When the light-scattering sheet 2 is thus interposed between the back electrode plate 7b and the reflector 5, as in the above arrangement of interposing the light-scattering sheet 2 between the polarizer 1 and the front electrode plate 7a, both incident light and reflected light can be scattered so that the specular reflection from the reflector 5 can be sufficiently precluded.

Figure 4:
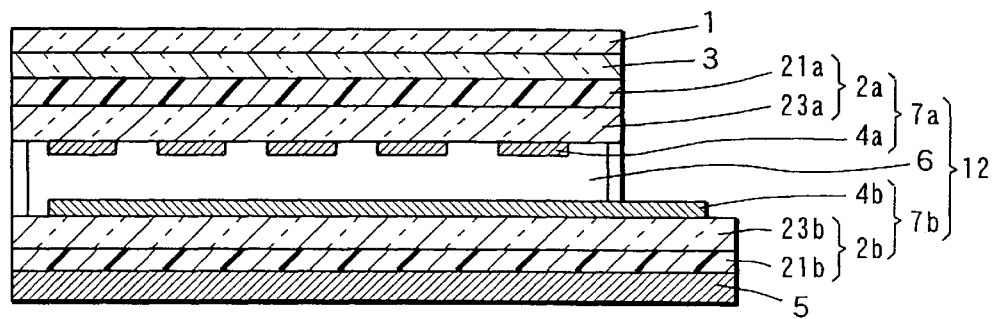
FIG. 4 is a schematic cross-section view showing another example of the liquid crystal display device embodying the present invention.

FIG. 4 is a schematic cross-section view showing the liquid crystal display device in mode (iii) where the substrate is constituted of a light-scattering sheet. This liquid crystal display device comprises a polarizer 1 laminated through an optical retardation film 3 on the front of a liquid crystal cell 12 and a reflector 5 is laminated behind the liquid crystal cell 12. In this liquid crystal cell 12, light-scattering sheets (front electrode plates) 2a, 2b composed of substrate sheets 23a, 23b and, as formed thereon, light-scattering layers 21a, 21b (including front electrode plates 2a, 2b), respectively, are used as substrate sheets (electrode-supporting substrate) 22b, 22b, with transparent conductive layers 4a, 4b being formed on the liquid crystal sides of said two substrate sheets (light-scattering sheets).

In the case of such a liquid crystal display device, the substrate sheet (electrode-supporting substrate) can be constituted of a light-scattering sheet so that an independent light-scattering layer (light-scattering sheet) can be dispensed with. Therefore, the thickness of the liquid crystal display device can be reduced without detracting from the brightness of the display screen. Furthermore, by reducing the thickness of the LCD device in this manner, the double image formation by the liquid crystal and the light-scattering layer can be sufficiently precluded to insure a sharper image and provide a very bright, clear quality panel.

When the substrate is constituted of a light-scattering sheet, it is not always necessary to form both the front substrate sheet 22a and back substrate sheet 22b using light-scattering sheets 2 but it is sufficient that only one of the two substrate sheets be constituted of a light-scattering sheet 2. For example, when the back substrate sheet 22b is constituted of a light-scattering sheet 2b, the front substrate sheet 7a may be comprised of a non-scattering transparent substrate sheet.

When the front substrate sheet 22a is constituted of a light-scattering sheet 2a, too, a non-scattering transparent substrate sheet can be chosen for the front substrate sheet 7a. Furthermore, when the front substrate sheet 22a is constituted of a light-scattering sheet 2a, the back electrode (conductive layer) 4b may be a light reflective electrode, and when such a light reflective electrode is used, said reflector 5 need not necessarily be provided.

As the light-scattering sheet, a light-scattering sheet having said bicontinuous phase structure can be used with advantage. When a reflecting type LCD device is constructed using a light-scattering sheet having a bicontinuous phase structure, the reflected light can be diffused or scattered and, at the same time, the scattered light can be directed in a given direction, with the result that a sufficient brightness can be attained even in color display. Therefore, the resulting device can be advantageously applied to a color reflecting type LCD. When a light-scattering sheet having said bicontinuous phase structure is utilized as said light-scattering sheet, directionality can be imparted to reflected light so that, even in the case of transmitting type liquid crystal display (an LCD device with a back light in lieu of a reflector), a bright liquid crystal image can be observed over a wide viewing angle. Furthermore, when a light-scattering sheet having a bicontinuous phase structure is used as the light-scattering sheet, the position of the light-scattering sheet is not particularly restricted.

The polarizer 1, optical retardation film 3, reflector 5 and transparent conductive layers 4a, 4b may be the same as those mentioned for the composite sheet.

As the electrode plate carrying a transparent conductive layer (light-transmitting electrode plate), an electrode plate composed of a substrate (transparent substrate) such as a glass sheet or a plastic sheet (e.g. a plastic sheet similar to said substrate sheet) and a transparent conductive layer formed on the surface of said substrate sheet in the same manner as said transparent conductive sheet (light-scattering transparent conductive sheet) can be employed.

The electrode plate carrying a reflective conductive layer (a reflective electrode plate) can be obtained by forming a metal layer (a reflective conductive layer) on a substrate sheet similar to that of said front electrode plate by a vapor deposition technique. The reflective conductive layer may have been subjected to a surface roughening treatment. The roughening treatment can be effected by vapor deposition under judiciously selected conditions or by the conventional roughening method. When such a roughened reflective back electrode plate is used, not only a voltage can be applied to the liquid crystal in the LCD device but the incident light can be reflected with adequate scattering, avoiding specular reflection.

The conductive layer (e.g. transparent conductive layer and reflective conductive layer) is patterned in a stripe form to give a stripe electrode. This patterning of the conductive layer can be carried out by a resist-forming technique such as photolithography or an etching technique. The front and back electrode plates may be so disposed that the stripe electrode of the front electrode plate and the stripe electrode of the back electrode plate will cross each other (for example, in an orthogonally intersecting manner).

Furthermore, for providing the liquid crystal with an alignment suited for reflecting type LCD (in the one-polarizer system shown in FIGS. 7, 9, 11 and 4, chiefly a vertical alignment), both the conductive layers may each be formed with an alignment film by coating and, after drying, subjected to a rubbing treatment. As the alignment film, a vertically oriented polyimide film is mostly used.

The liquid crystal cell 12 can be prepared by forming (printing) sealing portions by screen printing on the respective conductive layer sides of the electrode plates 7a, 7b, disposing spacers 13 on said sealing portions, and laminating together the two electrode plates 7a, 7b with the spacer 13 sandwiched. The liquid crystal can be injected into the space (cell) formed on said lamination by the conventional technique such as vacuum injection. The injection port is sealable with a sealant (e.g. a UV-curable sealant).

The liquid crystal display device is not restricted to a one-polarizer reflecting type LCD device having only one polarizer plate but may be a two-polarizer reflecting type LCD device having two polarizer plates varying in polarizing characteristic. Moreover, the one-polarizer reflecting type LCD device may for example be a reflecting type LCD device representing a combination of one polarizer with any of various modes (e.g. the mode using a twisted nematic liquid crystal, the R-OCB (optically compensated bend) mode, a parallel alignment mode, etc.).

The above liquid crystal display device can be constructed by laminating said polarizer, light-scattering sheet, liquid crystal cell and, where necessary, said optical retardation film and reflector together with the aid of an adhesive (adhesive). Usually, the polarizer, light-scattering sheet, optical retardation film and light-scattering plate are previously formed with an adhesive layer on the surface (both sides or one side). When an adhesive layer is formed on one side of a light-scattering sheet comprising a light-scattering layer and a substrate sheet, the self-adhesive layer (adhesive layer) is often formed on the light-scattering layer side for protecting the light-scattering layer.

By forming a self-adhesive layer on one side each of the polarizer plate, light-scattering sheet, optical retardation film and light-scattering plate, a liquid crystal display device can be conveniently fabricated. For example, when a liquid crystal display device is manufactured by laminating a polarizer with a light-scattering sheet and a liquid crystal cell, the light-scattering sheet and polarizer plate can be laminated together by utilizing the self-adhesive (adhesive) of the polarizer. Thus, a liquid crystal display device can be manufactured by laminating the light-scattering sheet with the optical retardation film or the liquid crystal cell (the front electrode sheet) by exploiting the self-adhesive layer formed on one side of the light-scattering sheet.

In manufacturing a liquid crystal display device by laminating the polarizer, optical retardation film, light-scattering sheet and liquid crystal cell, too, the light-scattering sheet and the optical retardation film can be laminated together by utilizing a self-adhesive (adhesive) layer formed on the optical retardation film. Similarly, by means of the self-adhesive layer formed on one side of the light-scattering sheet, the light-scattering sheet and the liquid crystal cell (front substrate sheet) can be laminated together. Where necessary, it is possible to laminate together the light-scattering sheet and optical retardation film by utilizing the self-adhesive of the light-scattering sheet and laminate together the optical retardation film and liquid crystal cell (front substrate sheet) by utilizing the self-adhesive of the optical retardation film. Then, by exploiting the self-adhesive of the polarizer, this polarizer can be laminated with the optical retardation film or the light-scattering sheet to complete a liquid crystal display device.

Furthermore, when the light-transmitting back electrode plate is to be laminated with the light-scattering sheet and the reflector, the reflector and light-scattering sheet can be laminated with the self-adhesive (adhesive) of the reflector. In this case, the light-scattering sheet can be laminated with the back electrode plate by utilizing a self-adhesive layer formed On one side of the light-scattering sheet for the purpose. Moreover, a liquid crystal display device can be manufactured by laminating the front side of said liquid crystal cell with the optical retardation film formed with a self-adhesive layer and the polarizer film formed with a self-adhesive layer in the order mentioned.

When an adhesive layer is formed on both sides of each of the polarizer, light-scattering sheet, optical retardation film and light-scattering plate, particularly on both sides of the light-scattering sheet, the sheet can be laminated without identifying the self-adhesive side so that the production process is simplified and the bond strength is enhanced.

Figure 16:
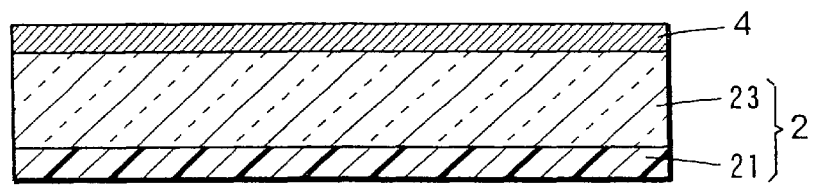
FIG. 16 is a schematic cross-section view showing yet another example of the composite sheet according to the present invention.

The production of the liquid crystal display device may be carried out using said composite sheets (e.g. the light-scattering sheet-polarizer laminate, light scattering sheet-optical retardation film laminate, light-scattering sheet-reflector laminate, light-scattering sheet-transparent conductive layer laminate (transparent conductive sheet)). For example, the liquid crystal display device illustrated in FIG. 7 can be fabricated by using the composite sheet comprising a laminate of polarizer 1 and light-scattering sheet 2 (FIG. 6); the liquid crystal display device illustrated in FIG. 9 can be fabricated by using a composite sheet (binary sheet) comprising a laminate of optical retardation film 3 and light-scattering film 2 (FIG. 8) or a composite sheet (ternary sheet) comprising said binary sheet and a polarizer 1 further laminated in superimposition on its optical retardation film 3 (FIG. 12); the liquid crystal display device illustrated in FIG. 11 can be fabricated by using a composite sheet comprising a laminate of light-scattering sheet 2 and reflector 5 (FIG. 11), and the liquid crystal display device illustrated in FIG. 4 can be fabricated by using a transparent conductive sheet comprising a light-scattering sheet 2 and, as formed thereon, a transparent conductive layer 4 (FIG. 16). With such composite sheets, reflecting type liquid crystal display devices can be manufactured without modifying the existing production line for the conventional liquid crystal display devices.

In fabricating a liquid crystal display device using a composite sheet, the composite sheet is preferably disposed (laminated) to the liquid crystal cell in such a manner that the light-scattering sheet of the composite sheet will come close to the liquid crystal cell. For example, in fabricating a reflecting type liquid crystal display device by disposing a composite sheet composed of a light-scattering sheet and a polarizer (or an optical retardation film) on the viewer side of the liquid crystal cell, the composite sheet is preferably disposed (laminated) with the light-scattering sheet facing the liquid crystal cell (that is to say with the polarizer (or optical retardation film) facing the viewer). When the composite sheet is disposed with its light-scattering sheet in proximity with the liquid crystal, a further improvement is realized in the clarity of images.

INDUSTRIAL APPLICABILITY

With the light-scattering sheet, composite sheet or liquid crystal display device according to the present invention, the visibility of the liquid crystal display can be improved. Therefore, the invention can be applied with advantage to reflecting type LCD, particularly the liquid crystal display device of portable information equipment. Furthermore, in accordance with the technology of the invention for producing light-scattering sheets, which exploits spinodal decomposition, directionally diffusing sheets can be easily produced.

With the light-scattering sheet, composite sheet and liquid crystal display device according to the present invention, partly because directionality can be imparted to reflected light and partly because the light-scattering sheet can be disposed close to the liquid crystal cell, the visibility of the liquid crystal image can be improved. Moreover, with the composite sheet of the present invention which is a laminate of a light-scattering sheet and one or more other functional layers, the specular reflection of the liquid crystal display device can be prevented to improve the visibility of images without modifying the device production line, without increasing the cost of production, and without reducing the product yield. Particularly when the transparent conductive sheet is used, because it has electrical conductivity, the electrode plate for an LCD device can be constituted of the sheet, with the result that a liquid crystal device of high image quality and reduced thickness can be manufactured easily and at low cost. In addition, with the liquid crystal display device of the present invention, not only the visibility of the liquid crystal image can be improved but, because the light-scattering sheet is disposed rearwardly of the polarizer, the surface marring-resistance of the liquid crystal display device can be improved, thus contributing to an enhanced durability of the liquid crystal display device at low cost.

EXAMPLES

The following examples are further illustrative of the present invention without defining the scope of the invention.

In the examples and comparative examples, the following resins, polarizers and optical retardation films were used.

Resins

PMMA-1: poly(methyl methacrylate) (manufactured by Mitsubishi Rayon, "BR-87", weight average molecular weight (Mw)=25,000, refractive index=1.49)

PMMA-2: poly(methyl methacrylate) (manufactured by Mitsubishi Rayon, "BR-83", weight average molecular weight (Mw)=40,000, refractive index=1.49)

PMMA-3: poly(methyl methacrylate) (manufactured by Mitsubishi Rayon, "BR-80", weight average molecular weight (Mw)=95,000, refractive index=1.49)

PMMA-4: poly(methyl methacrylate) (manufactured by Mitsubishi Rayon, "BR-88", weight average molecular weight (Mw)=480,000, refractive index=1.49)

PMMA-5: poly(methyl methacrylate) (PMMA)-series powder (manufactured by Sekisui Chemical, "MBX-2")

SAN-1: poly(styrene-co-acrylonitrile) (manufactured by Techno Polymer, "290-ZF", weight average molecular weight (Mw)=69,000, refractive index=1.57)

SAN-2: poly(styrene-co-acrylonitrile) (manufactured by Techno Polymer, "SAN-T", weight average molecular weight (Mw)=107,000, refractive index=1.57)

SAN-3: poly(styrene-co-acrylonitrile) (manufactured by Techno Polymer, "SAN-L", weight average molecular weight (Mw)=100,000, refractive index=1.57)

SAN-4: poly(styrene-co-acrylonitrile) (manufactured by Daicel Chemical Industries, Ltd., "080", weight average molecular weight (Mw)=110,000, refractive index=1.55)

SAN-5: poly(styrene-co-acrylonitrile) (manufactured by Daicel Chemical Industries, "080SF", weight average molecular weight (Mw)=110,000, refractive index=1.55)

CEL-1: cellulose triacetate (manufactured by Daicel Chemical, "LT-105")

PETG-1: poly(ethylene terephthalate)-series amorphous copolyester (manufactured by Eastman Chemical, "Eastar PETG 6763", refractive index=1.567)

GPPS-1: general polystyrene (manufactured by Daicel Chemical, "GPPS #30", refractive index=1.589)

PES-1: polyethersulfone sheet (manufactured by Sumitomo Chemical, thickness=100 μm)

Polarizers

Polarizer A: an LCD polarizer film (manufactured by Nitto Denko, "NPF")

Polarizer B: a polarizer film based on uniaxially oriented iodinated (iodine-adsorbed) PVA film carrying an adhesive layer on one side and having a roughened and processed surface on the other side, as protected with a protective film (triacetylcellulose film). The protective film is peeled off the polarizer in the course of manufacture of a LCD device.

Optical Retardation Films

Retardation film A: an LCD optical retardation film (manufactured by Nitto Denko, "NRF")

Retardation film B: a polycarbonate optical retardation film

Reflectors

Reflector A: a resin sheet carrying a 100 μm-thick vapor-deposited Al layer topped by an adhesive layer Reflector B: an aluminum foil (50 μm thick) carrying an adhesive layer Example 1

Figure 19:
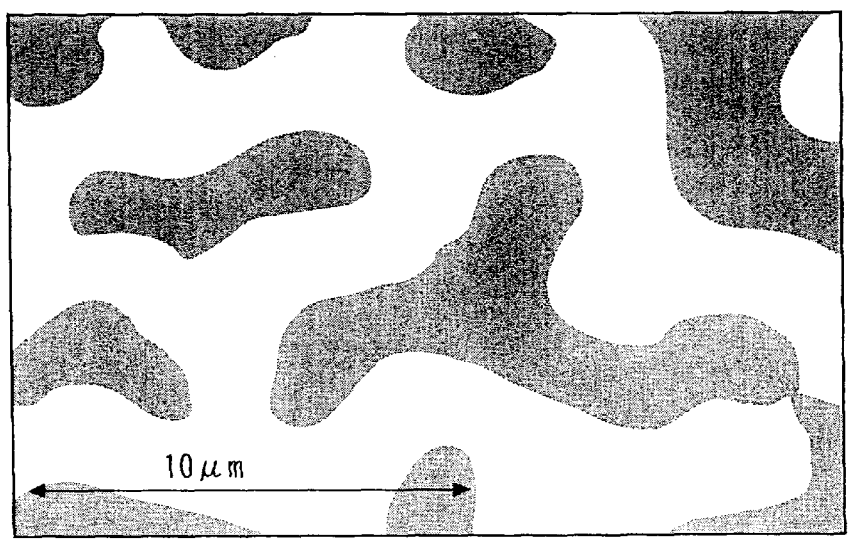
FIG. 19 is a schematic diagram showing the transmission light microscopic findings of the sheet obtained in Example 1.

In 400 weight parts of a mixed solvent of methylene chloride and methanol (9/1, by weight) were dissolved 50 weight parts of poly(methyl methacrylate) (PMMA-4) and 50 weight parts of poly(styrene-co-acrylonitrile) (SAN-4). This solution was cast on a glass plate to form an 8 μm-thick layer. The glass plate was heated on a hot plate at 280° C. for 1 minute. After this heat treatment, the glass plate-resin sheet was dipped in a cold water bath. The sheet was peeled from the glass plate, spread on a frame and dried (thickness: 10 μm). When examined with a transmission light microscope, the sheet thus obtained was found to have an intermediate structure between a bicontinuous structure and a particle dispersion (droplet) structure, the average interphase distance of the continuous phases being about 6 μm. The total light transmittance of this sheet was 93%. A schematic diagram depicting the phase structure observed by transmission light microscopy is presented in FIG. 19.

Example 2

Except that the temperature of heat treatment was changed to 250° C. and the duration of heat treatment was changed to 3 minutes, the procedure of Example 1 was otherwise followed. The resulting sheet was examined with a transmission light microscope. As a result, the sheet was found to have an intermediate structure between the bicontinuous phase structure and the droplet phase structure, with an average interphase distance of about 6 μm.

Reference Example 1

In 900 weight parts of a mixed solvent of methylene chloride and methanol (9/1, by volume) were dissolved 80 weight parts of cellulose triacetate (CEL-1) flakes. Then, 20 weight parts of PMMA powder (PMMA-5) was mixed and the mixture was cast to give a 150 μm-thick sheet. When examined with a transmission light microscope, the sheet was found to have a droplet phase structure, the average diameter of droplets being 3 μm. The total light transmittance of the sheet was 92%.

The performance characteristics of the light diffusing sheets obtained in Examples 1 and 2 and Reference Example 1 were evaluated by the following procedures.

(Directionality 1)

Figure 21:
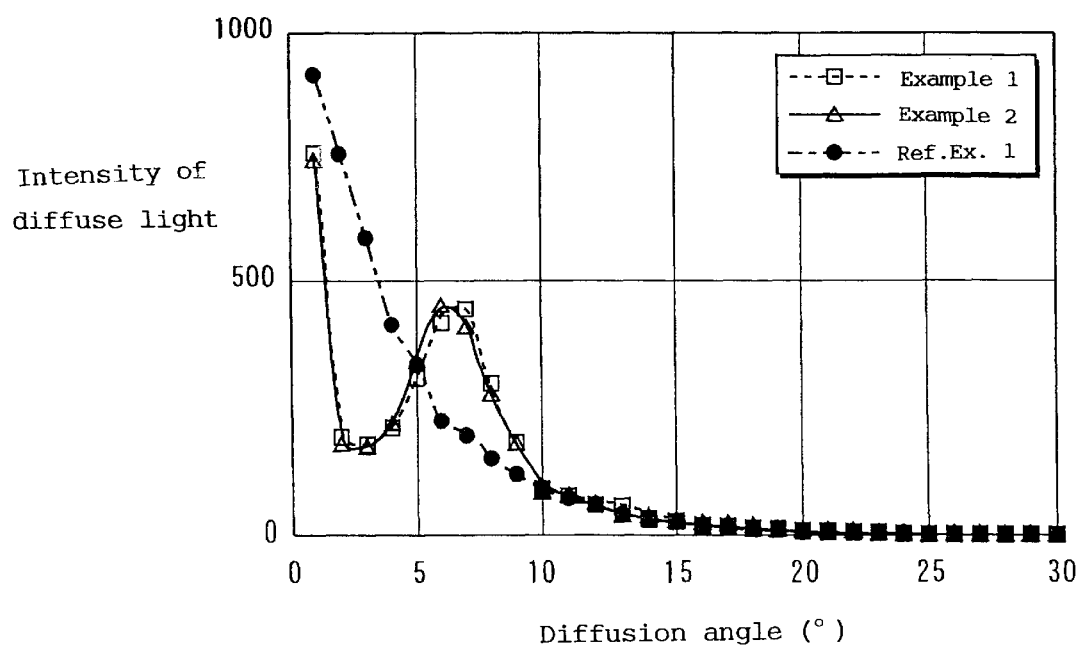
FIG. 21 is a graph showing the directionality of a light-scattering sheet.

Using each of the light-diffusing sheets obtained as above, the reflecting type LCD model device shown in FIG. 2 was constructed. The device was illuminated with a laser beam (Nihon Kagaku ENG NEO-20MS) in a vertical direction from the front and the intensity (diffusion intensity) of reflected light at the diffusion angle θ1 was measured. The results are shown in FIG. 21. It is apparent from FIG. 21 that whereas the particle-dispersion type light-diffusing sheet having a droplet phase structure (an islands-in-an ocean structure) of Reference Example 1 showed a Gaussian diffusion intensity distribution, the sheet according to this example showed a diffusion intensity destruction directed in a given direction (a diffusion angle of about 7°)

(Directionality 2)

Figure 5:
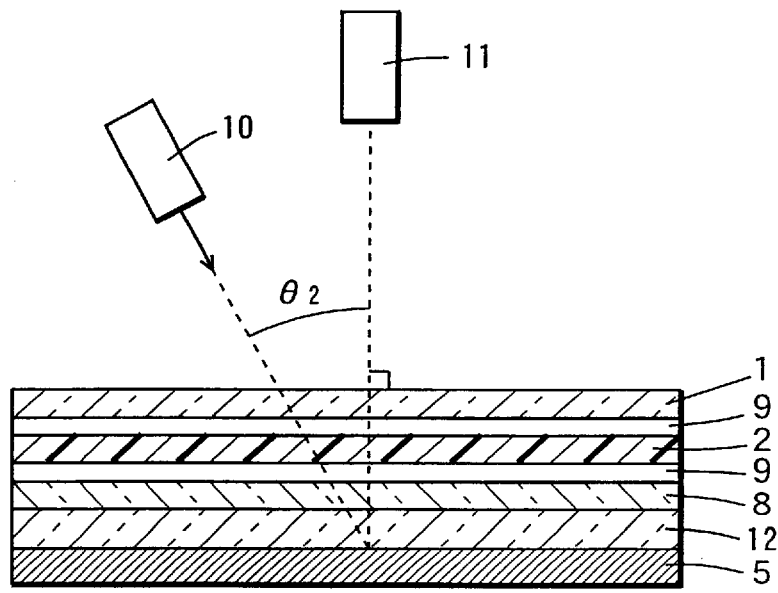
FIG. 5 is a schematic diagram explaining another method of evaluating the directionality of a light-scattering sheet.

Reflection type LCD model devices similar to the device illustrated in FIG. 2 were constructed. Each device was illuminated with a white spot light from an oblique direction and the intensity of light reflected in the perpendicular direction was measured (FIG. 5). The intensity of reflected light corresponding to the angle of incidence (diffusion angle θ2) was evaluated according to the following criteria.

A: bright
B: ordinary
C: dark

The results are shown in Table 2

TABLE 2

| Diffusion Angle θ2 | Example 1 | Example 2 | Reference Example 2 |
| --- | --- | --- | --- |
| 5° | A | A | B |
| 10° | A | A | B |
| 15° | A | A | B |
| 20° | B | B | B |
| 30° | C | C | B |

It will be apparent from Table 2 that the transmitting type light diffusing sheets according to the examples have high directionality for a given angle of diffusion (angle of incidence).

Example 3

Figure 20:
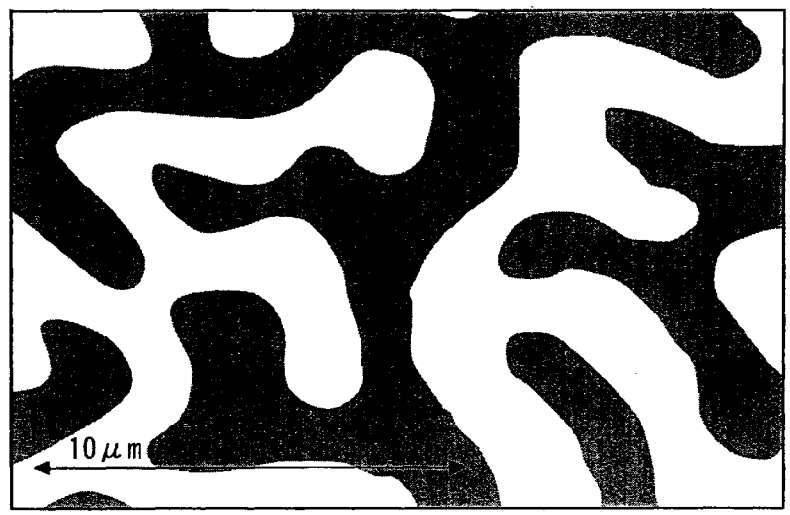
FIG. 20 is a schematic diagram showing the transmission light microscopic findings of the sheet obtained in Example 3.

Except that the temperature of heat treatment was changed to 230° C., the duration of heat treatment to 10 minutes, and the sheet thickness to 14 μm, the procedure of Example 1 was otherwise followed. The sheet thus obtained was examined using a transmission light microscope. As a result, the sheet was found to have a bicontinuous phase structure, the average interphase distance of continuous phases being about 6 μm. A schematic diagram of this bicontinuous phase structure is presented in FIG. 20.

Example 4

Except that the sheet thickness was changed to 8 μm, the procedure of Example 3 was otherwise repeated. When examined with a transmission light microscope, the resulting sheet was found to have a bicontinuous phase structure, the average interphase distance of continuous phases being about 4 μm.

Example 5

Except that the sheet thickness was changed to 10 μm, the procedure of Example 3 was otherwise repeated. When examined with a transmission light microscope, the resulting sheet was found to have a bicontinuous phase structure, the average interphase distance of continuous phases being about 4 μm.

Example 6

Except that the duration of heat treatment was changed to 7 minutes, the procedure of Example 5 was otherwise repeated. When examined with a transmission light microscope, the resulting sheet was found to have a bicontinuous phase structure, the average interphase distance of continuous phases being about 3 μm.

Example 7

Except that the duration of heat treatment was changed to 14 minutes, the procedure of Example 5 was otherwise repeated. When examined with a transmission light microscope, the resulting sheet was found to have an intermediate structure between the droplet phase structure and the bicontinuous phase structure, the average interphase distance of continuous phases being about 6 μm.

The directionality (directionality 2) of the sheets obtained in Example 3 to 7 was evaluated as in Example 1.

The results are shown in Table 3.

TABLE 3

| Diffusion angle θ2 | Example 3 | Example 4 | Example 5 | Example 6 | Example 7 |
|---|---|---|---|---|---|
| 5° | B | A | A | C | A |
| 10° | A | A | A | B | A |
| 15° | B | A | A | A | B |
| 20° | B | B | B | A | C |
| 30° | B | C | C | B | C |

It will be apparent from Table 3 that the transmitting type light diffusing sheets according to the examples have high directionality for a given angle of diffusion (angle of incidence).

Example 8 to 13

Poly(methyl methacrylate) (PMMA-1 to 4) and poly (styrene-co-acrylonitrile) (SAN-1 to 3) were formulated in the ratios shown in Table 4 and dissolved in a solvent (ethyl acetate). Using a bar coater, the resulting solution (dope) was cast on an alkali-free glass support and allowed to dry in the air for 24 hours to give a sheet of a given thickness. Each sheet on the glass was heat-treated in an oven under the temperature and time conditions indicated in Table 4. After heat treatment, the glass-sheet was dipped in cold water. The sheet was peeled from the glass support and dried to give a self-standing light-scattering sheet. This light-scattering sheet was evaluated for total light transmittance, light-scattering characteristic, linear light to diffuse light ratio, and brightness by the following methods.

(Total Light Transmittance)

Total light transmittance (transmissivity) was measured with a hazemeter (Nihon Denshoku Kogyo, NDH-300A) in accordance with JIS K7105.

(Light-scattering Characteristic)

Using the automatic laser light-scattering meter (manufactured by Japan Science & Engineering) shown in FIG. 3, the light scattering characteristic of the light-scattering sheet for the light incident on the sheet in a perpendicular direction (the intensity of scattered light (diffuse light) at a scattering angle) was measured. (Linear light/diffuse light ratio [I (θ0)/I (θmax)])

In the above light scattering characteristic test, the intensity of scattered light was plotted against the scattering angle and the ratio of the intensity of linearly transmitted light I (θ0) to the intensity of scattered light (diffuse light) I (θmax) was determined.

(Brightness)

Reflecting type LCD model devices similar to the device illustrated in FIG. 2 were constructed. Each device was illuminated with a white spot light from an oblique direction and the intensity of light reflected in a perpendicular direction was measured (FIG. 5). The intensity of reflected light in the perpendicular direction for an angle of incidence (diffusion angle θ2) was evaluated according to the following criteria.

Figure 22:
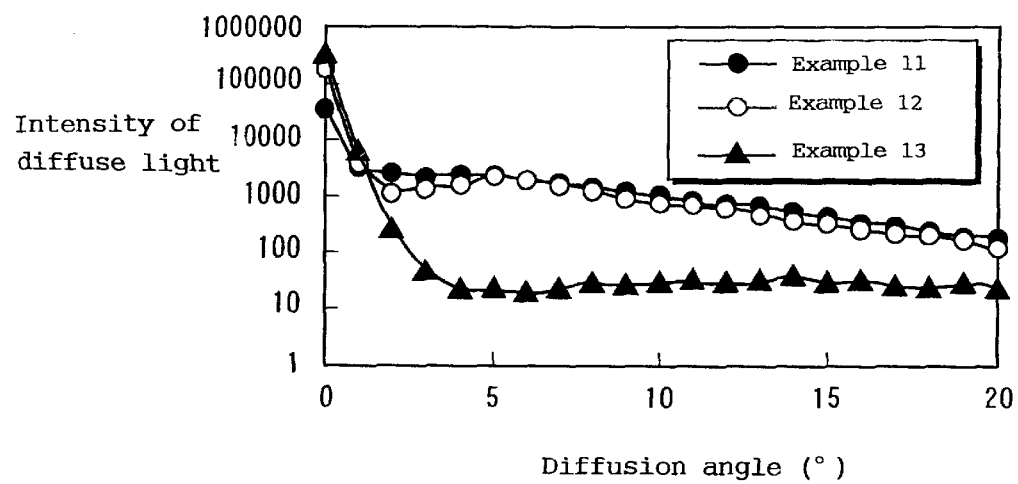
FIG. 22 is a semi-log plot showing the measured intensities of the linearly transmitted light and diffuse transmitted light of a light-scattering sheet.
Figure 23:
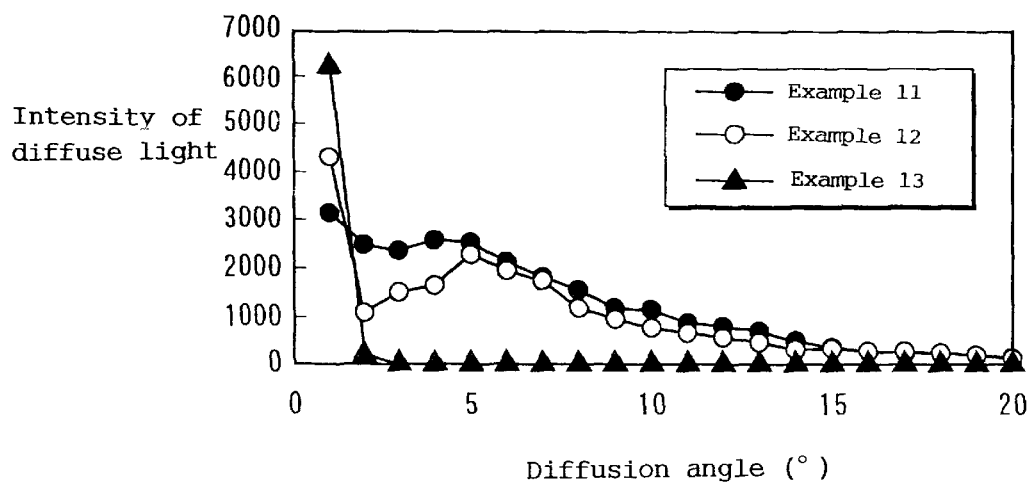
FIG. 23 is a graph showing the measured intensities of the linearly transmitted light and diffuse transmitted light of a light-scattering sheet.

D; AA: considerably brighter than Example 13
A: brighter than Example 13
B: Bright The results are shown in Tables 4 and 5 and FIGS. 22 and 23.

TABLE 4

| | Formulation (weight parts) | | | | | | | | Heat treatment parameters | |
|---|---|---|---|---|---|---|---|---|---|---|
| | Polymer 1 (PMMA) | | | | Polymer 2 (SAN) | | | Thickness (μm) | Temperature (° C.) | Time (min.) |
| | PMMA-1 | PMMA-2 | PMMA-3 | PMMA-4 | SAN-1 | SAN-2 | SAN-3 | | | |
| Example 8 | 70 | | | | | 30 | | 8 | 230 | 4 |
| Example 9 | 70 | | | | | | 30 | 8 | 210 | 5 |
| Example 10 | 70 | | | | | 30 | | 8 | 220 | 4 |
| Example 11 | | 70 | | | | 30 | | 27 | 230 | 4 |
| Example 12 | | | 30 | | 70 | | | 15 | 230 | 6 |

TABLE 4-continued

| | Formulation (weight parts) | | | | | | | Heat treatment parameters | |
|---|---|---|---|---|---|---|---|---|---|
| | Polymer 1 (PMMA) | | | | Polymer 2 (SAN) | | Thickness ($\mu$m) | Temperature (° C.) | Time (min.) |
| | PMMA-1 | PMMA-2 | PMMA-3 | PMMA-4 | SAN-1 | SAN-2 | SAN-3 | | | |
| Example 13 | | | | 60 | 40 | | | 8 | 260 | 20 |

TABLE 5

| | Total light transmittance (%) | Intensity of linearly transmitted light I (θ0) | Maximum intensity of diffuse light I (θmax) | Directionality (angle) of diffuse light θmax | I (θ0)/ I (θmax) | Brightness |
|---|---|---|---|---|---|---|
| Example 8 | 93.9 | 45,300 | 3,020 | 4° | 15 | AA |
| Example 9 | 94.2 | 48,000 | 3,200 | 4° | 15 | AA |
| Example 10 | 94.0 | 66,000 | 3,300 | 4° | 20 | AA |
| Example 11 | 93.8 | 33,732 | 2,548 | 5° | 13 | AA |
| Example 12 | 94.2 | 188,306 | 2,257 | 5° | 84 | A |
| Example 13 | 93.0 | 378,991 | 37 | 14° | 10,243 | B |

It will be apparent from Tables 4 and 5 that with any of the light-scattering sheets according to Examples 8~13, the liquid crystal display image can be brightened.

Particularly, the light-scattering sheets of Examples 8 to 12 which are constituted of polymers of the defined molecular weights have high total light transmittance values and low linear light/diffuse light ratios (I (θ0)/I (θmax)) so that the external light can be effectively taken in. Therefore, the brightness of the liquid crystal image is particularly high.

Example 14

In 400 weight parts of methylene chloride-methanol (9/1, by weight) were dissolved 50 weight parts of poly(methyl methacrylate) (PMMA-4) and 50 weight parts of poly (styrene-co-acrylonitrile) (SAN-4). This solution was cast on a polyethersulfone sheet (PES-1) to form a 115 $\mu$m-thick coating sheet. This coating sheet was heated at 230° C. for 10 minutes. After heat treatment, the coating sheet was dipped in a cold water bath and dried thoroughly. When examined using a transmission light microscope, the resulting sheet was found to have an intermediate structure between the bicontinuous phase structure and the droplet structure, the average interphase distance of continuous phases being about 6 $\mu$m. The total light transmittance of the sheet was 93%.

Figure 6:
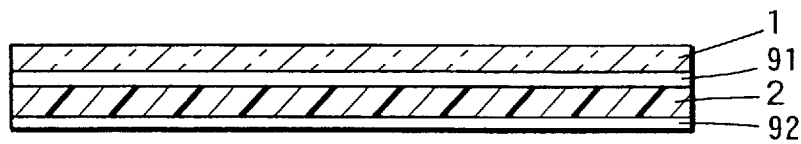
FIG. 6 is a schematic cross-section view showing an example of the composite sheet according to the present invention.

By means of a self-adhesive layer 91 formed on the polarizer (Polarizer A) 1, the polarizer 1 was laminated to the polyethersulfone sheet layer of said sheet having a bicontinuous phase structure (light-scattering sheet 2). Then, an acrylic self-adhesive layer 92 was formed by coating on the surface (light-scattering layer) of the above light-scattering sheet 2 and dried to give a composite sheet A (laminate sheet) (FIG. 6). The surface of the polarizer 1 was protected with a protective film (not shown) and the surface of the self-adhesive layer 92 was protected with a PET film (50 $\mu$m thick) (parting film).

The protective film and parting film were peeled from the composite sheet A, and by utilizing the self-adhesive layer 92, the composite sheet A was laminated onto the liquid crystal cell 12 to provide the liquid crystal display device of FIG. 7. A glass sheet (thickness: 1 mm) was used for each of the front substrate 22a and back substrate 22b of the liquid crystal cell 12; an indium tin oxide thin film was used for the transparent front electrode 4a; and an aluminum thin film was used for the reflective back electrode 4c.

Since the composite sheet A comprising a laminate of polarizer 1 and light-scattering sheet 2 was employed, the composite sheet A could be expediently laminated in the polarizer-laminating stage of the production line so that a liquid crystal display device having the light-scattering sheet 2 could be constructed without modifying the existing LCD device production line. Therefore, a reflecting type liquid crystal device could be manufactured without incurring an additional expenditure and without detracting from product yield.

When the display image of this reflecting type LCD device was visually evaluated under illumination with a fluorescent tube, it was found that the specular reflection had been diminished and a sharp clear-cut image of high contrast could be observed.

Example 15

After the light-scattering sheet 2 was laminated on the surface of the liquid crystal cell 12, the polarizer 1 was laminated on the surface of said light-scattering sheet 2 to fabricate the reflecting type liquid crystal display device of FIG. 7.

The production process was complicated as compared with Example 14 but this liquid crystal display device was as good as the device of Example 14 in the visibility of the display image.

Example 16

Figure 8:
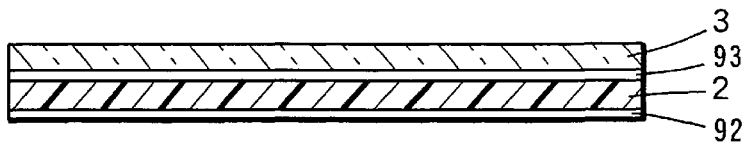
FIG. 8 is a schematic cross-section view showing another example of the composite sheet according to the present invention.

By means of the self-adhesive layer 93 on the optical retardation film (Retardation film A) 3, the optical retardation film 3 was laminated to the light-scattering sheet (the light-scattering sheet according to Reference Example 1) 2. Then, an acrylic self-adhesive layer 92 was formed on the surface of said light-scattering sheet 2 by coating and dried to provide a composite sheet B (laminate sheet) (FIG. 8). Incidentally, the surface of the optical retardation film 3 was protected with a protective film (not shown) and the surface of the self-adhesive layer 92 was protected with a PET film coated with a silicone mold release (50 µm thick) (parting film).

The protective film and parting film were exfoliated from the composite sheet B, and by utilizing the self-adhesive layer 92, the composite sheet B was laminated to the liquid crystal cell 12. Then, a polarizer (Polarizer A) was laminated on the surface of said composite sheet B to fabricate the liquid crystal display device of FIG. 9. A glass sheet (thickness: 1 mm) was used for each of the front substrate 22a and back substrate 22b of the liquid crystal cell 12; an ITO thin film for the transparent front electrode 4a; and an aluminum thin film for the reflective back electrode 4c.

Since the composite sheet B comprising a laminate of an optical retardation film 3 and a light-scattering sheet 1 was employed, the composite sheet B could be expediently laminated in the retardation film-laminating stage of the LCD device production line so that a liquid crystal display device equipped with the light-scattering sheet could be fabricated without modifying the existing production line. Thus, the reflecting type liquid crystal display device could be manufactured without incurring an increased cost or detracting from product yield.

When the display image of this reflecting type LCD device was visually evaluated under illumination with a fluorescent tube, it was found that the specular reflection had been diminished and a sharp clear-cut image of high contrast could be observed.

Example 17

First, 90 weight parts of an amorphous copolyester (PETG-1) as transparent base resin and 10 weight parts of a thermoplastic resin (GPPS-1) as particulate dispersant component were respectively dried at 70° C. for 4 hours and kneaded together in a Banbury mixer. The kneaded resin composition was fed to an extrusion machine, in which it was melted at 240° C. and extruded from a T-die in a sheet form, which was then cooled to solidify over a cooling drum controlled at a surface temperature of 25° C. (melt-forming). The resulting sheet (light-scattering sheet 2) had a thickness of 120 µm and a total light transmittance value of 91%.

Figure 10:
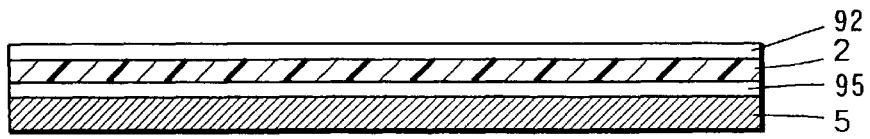
FIG. 10 is a schematic cross-section view showing still another example of the composite sheet according to the present invention.

By utilizing the self-adhesive layer 95 of a reflector 5 (Reflector A), the reflector 5 was laminated to the above sheet having a particle dispersion structure (light-scattering sheet 2). Then, an acrylic self-adhesive layer 92 was formed on the surface of said light-scattering sheet 2 and dried to give a composite sheet C (laminate sheet) (FIG. 10). The surface of the reflector 5 was protected with a protective film (not shown) and the surface of the self-adhesive layer 92 was protected with a PET film coated with a silicone mold release (thickness: 50 µm) (parting film).

The protective film and parting film were exfoliated from the composite sheet C, and by utilizing the self-adhesive layer 92, the composite sheet C was laminated to the back side of the liquid crystal cell 12. Then, the optical retardation film 3 and polarizer 1 were laminated to the viewer side of said liquid crystal cell 12 to fabricate the liquid crystal display device of FIG. 11. A plastic sheet (PES-1) was used for each of the front substrate 22b and back substrate 22b of the liquid crystal cell 12 and a ITO thin film stripe transparent electrode was formed for each of the transparent front electrode 4a and back electrode 4b.

Since the composite sheet C comprising a laminate of a reflector 5 and a light-scattering sheet 2 was employed, the composite sheet C could be expediently laminated in the reflection film-laminating stage of the LCD device production line so that a liquid crystal display device equipped with the light-scattering sheet 2 could be fabricated without modifying the existing production line. Thus, the reflecting type liquid crystal display device could be manufactured without incurring any additional cost or detracting from product yield.

When the display image of this reflecting type LCD device was visually evaluated under illumination with a fluorescent tube, it was found that the specular reflection had been diminished and a sharp clear-cut image of high contrast could be observed.

Example 18

Figure 12:
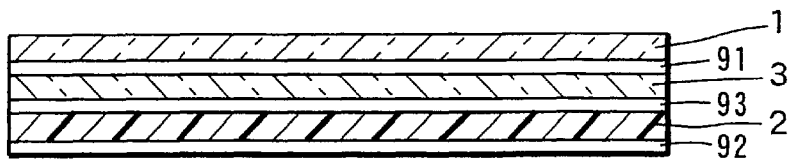
FIG. 12 is a schematic cross-section view showing a further example of the composite sheet according to the present invention.

By utilizing the self-adhesive layer 91 of the polarizer 1 (Polarizer A), the polarizer 1 was laminated to the optical retardation film (Retardation film B), and utilizing the self-adhesive layer 93 of this optical retardation film 3, the retardation film 3 was laminated to the light-scattering sheet 2 (the light-scattering sheet according to Example 14). Then, an acrylic self-adhesive layer 92 was formed on the surface of the light-scattering sheet 2 by coating and dried to fabricate a composite sheet D (laminate sheet) (FIG. 12). The surface of the polarizer 1 was protected with a protective film (not shown) and the surface of the self-adhesive layer 92 was protected with a PET film coated with a silicone mold release (thickness: 50 µm) (parting film).

A liquid crystal display device was fabricated using the above composite sheet D comprising a laminate of polarizer 1, optical retardation film 3 and light-scattering sheet 2. As a result, the polarizer-laminating stage and the optical retardation film-laminating stage in the LCD device production line could be replaced by the one-step composite sheet D-laminating stage so that the liquid crystal display device equipped with the light-scattering sheet 2 could be fabricated in a simplified production flow. Therefore, the reflecting type liquid crystal display device could be manufactured at reduced cost and without detracting from product yield.

When the display image of this reflecting type LCD device was visually evaluated under illumination with a fluorescent tube, it was found that the specular reflection had been diminished and a sharp clear-cut image of high contrast could be observed.

Example 19

Figure 13:
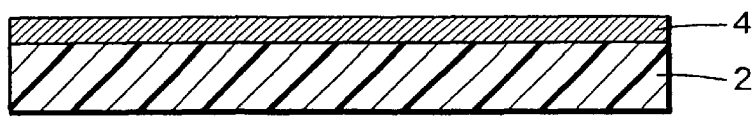
FIG. 13 is a schematic cross-section view showing a still further example of the composite sheet according to the present invention.

On the surface of the light-scattering sheet 2 of Reference Example 1, a transparent ITO conductive layer 4 (thickness= 450 Å) was formed by sputtering to give the transparent conductive sheet illustrated in FIG. 13. The surface resistivity of the transparent conductive layer was $100\Omega/\square$. The thickness, total light transmittance and light-scattering characteristic of the sheet were comparable to those of the light-scattering sheet according to Reference Example 1.

Example 20

Figure 14:
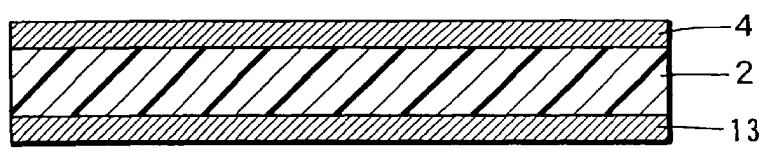
FIG. 14 is a schematic cross-section view showing still another example of the composite sheet according to the present invention.

On the non-VD side, i.e. the surface not formed with a vapor-deposited transparent conductive layer, of the transparent conductive sheet according to Example 19, an ITO antistatic layer (thickness: 50 Å) was formed by sputtering to give a transparent conductive sheet comprising a laminate of antistatic layer 13-transparent conductive layer 4-light scattering sheet 2 (FIG. 14). The surface resistivity of the antistatic layer was 20 kΩ/□. The thickness, total light transmittance and light-scattering characteristic of the sheet were comparable to those of the light-scattering sheet according to Example 19.

Example 21

In methylene chloride-methanol mixed solvent (9/1, by weight) were dissolved 50 weight parts of poly(methyl methacrylate) (PMMA-4) and 50 weight parts of poly (styrene-co-acrylonitrile) (SAN-5). This solution was cast on a polyethersulfone sheet (PES-1), dried, and heat-treated at 230° C. for 10 minutes. The resulting sheet was cooled by dipping in cold water and dried thoroughly to give a light-scattering sheet (sheet thickness: 115 μm, total light transmittance: 93%). When examined with a transmission light microscope, this light-scattering sheet was found to have a bicontinuous phase structure, the average interphase distance of continuous phases being about 6 μm. This light-scattering sheet was capable of directing diffuse light within a diffusion angle of about 70.

Figure 15:
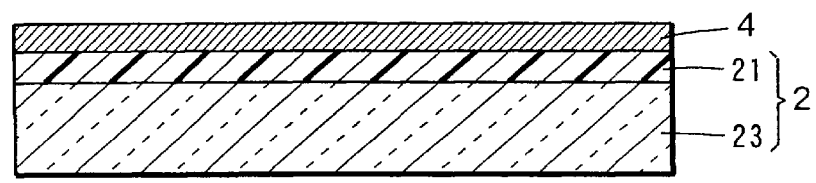
FIG. 15 is a schematic cross-section view showing still another example of the composite sheet according to the present invention.

On the bicontinuous phase side of the light-scattering sheet, a 450 Å-thick transparent conductive layer was formed by ITO sputtering to give a transparent conductive sheet comprising a laminate of substrate sheet 23-light-scattering sheet 21 with a transparent conductive layer 4 further laminated on the light-scattering layer side (FIG. 15). The surface resistivity of the transparent conductive layer was 100Ω. The thickness, total light transmittance and light-scattering characteristic of the sheet were comparable to those of the light-scattering sheet prior to formation of said transparent conductive layer.

Example 22

Except that a transparent conductive layer was formed on the PES side (the surface not formed with a bicontinuous phase structure) of the light-scattering sheet, the procedure of Example 21 was otherwise repeated to give a transparent conductive sheet (FIG. 16). The thickness of the transparent conductive layer was 450 Å and the surface resistivity thereof was 100Ω/□. The thickness, total light transmittance and light-scattering characteristic of this sheet were comparable to those of the light-scattering sheet according to Example 21.

Example 23

The transparent conductive sheet obtained in Example 22 was processed in a stripe electrode pattern by photolithography, and using the thus-processed sheet for each of the front substrate and back substrate, the STN reflecting type plastic LCD device of FIG. 4 was fabricated. Polarizer A was used as the polarizer 1, Retardation film A as the optical retardation film 3 and Reflector B as the reflector 5. The thickness of this liquid crystal display device was about 650 μm.

Using this reflecting type plastic LCD device, an image was displayed under fluorescent lamp. As a result, the reflected light at a diffusion angle of 0°, which corresponds to specular reflection, was decreased and directionality was imparted to diffuse light. Furthermore, a sharp image without blurring could be formed and a clear-cut image of high contrast could be observed.

Reference Example 2

Figure 17:
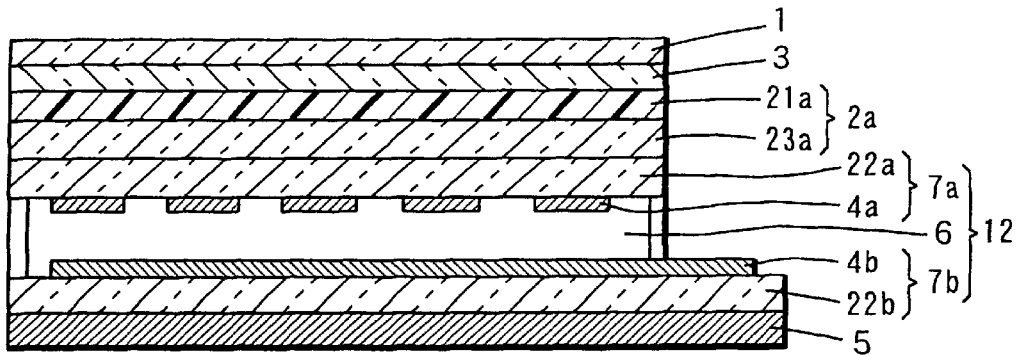
FIG. 17 is a schematic cross-section view showing a liquid crystal display device as described in Reference Example 2.

Except that the sheet described below was used for each of the front substrate and back substrate and that the light-scattering sheet 2 of Example 21 was laminated to the front substrate, the procedure of Example 23 was otherwise followed to fabricate a reflecting type plastic liquid crystal display device (FIG. 17). The thickness of this LCD device was about 770 μm.
(Front Electrode Plate and Back Electrode Plate)

On one side of a polyethersulfone sheet (PES-1), a transparent ITO conductive layer (thickness=450 Å) was constructed by the same technique as in Example 21. The transparent conductive layer of this sheet was processed in a stripe pattern by photolithography to provide a sheet for each of the front electrode plate 7a and back electrode plate 7b.

When the display images of the reflecting type plastic liquid crystal display devices according to Example 23 (FIG. 4) and Reference Example 2 (FIG. 17) were compared under fluorescent lamp, it was found that the reflecting type plastic liquid display device of Example 23 showed no reflecting image of the fluorescent lamp at all but a superior visibility of the display.

It will be apparent from Example 23 and Reference Example 2 that, in the liquid crystal display devices according to Examples 19 to 23, the transparent conductive sheet has not only a light scattering function but functions as an electrode plate so that an independent light-scattering sheet can be dispensed with. Therefore, the thickness of the liquid crystal display device can be reduced; when Example 23 is compared with Reference Example 2, the thickness reduction is about 120 μm. As a result, image blurring can be precluded and a sharp, clear-cult display image of high contract can be obtained.

Example 24

Except that Polarizer B was used as the polarizer 1, that the light-scattering sheet 2 was laminated to the front electrode supporting sheet 22a of the liquid crystal cell 12 instead of forming a laminate sheet A beforehand, and that a polarizer 1 was laminated on the surface of the light-scattering sheet 2, the procedure of Example 14 was otherwise followed to fabricate the reflecting type liquid crystal display device of FIG. 7.

The display image of this reflecting type liquid crystal display device was visually evaluated under fluorescent lamp. As a result, the specular reflection was found to have been diminished and a high-definition bright image of high contrast could be observed. Moreover, the surface (polarizer 1) of this reflecting type liquid crystal display device was not injured even when rubbed against with steel wool (#0000).

Comparative Example 1

Figure 18:
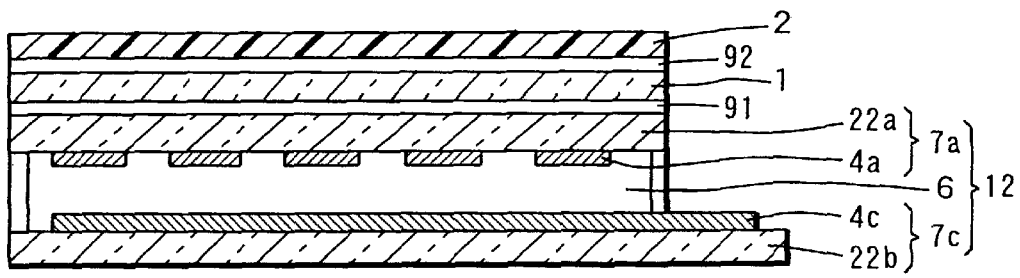
FIG. 18 is a schematic cross-section view showing a liquid crystal display device as described in Comparative Example 1.

Except that a polarizer 1 (Polarizer B) was laminated to the front substrate 22a of the liquid crystal cell 12 and that the light-scattering sheet 2 was further laminated on the surface of polarizer 1, the procedure of Example 24 was otherwise followed to fabricate the reflecting type liquid crystal device of FIG. 18.

The display image of this reflecting type LCD device was visually evaluated under fluorescent lamp. It was found that the specular reflection had been diminished by the light-scattering sheet 2 and the display image was not clear-cut as compared with the LCD device of Example 24. Moreover, when rubbed against with steel wool (#0000), the surface (light-scattering sheet 2) of this reflecting type liquid crystal display device was injured.

Example 25

Except that the light-scattering sheet of Reference Example 1 was used as light-scattering sheet 2, the procedure of Example 24 was otherwise followed to fabricate a reflecting type liquid crystal display device.

The display image of this reflecting liquid crystal display device was visually evaluated under fluorescent lamp. As a result, the specular reflection was found to have been diminished and a high-definition bright image of high contrast could be observed. Moreover, the surface (polarizer 1) of this reflecting type liquid crystal display device was not injured even when rubbed against with steel wool (#0000).

Example 26

The reflecting type liquid crystal display device of FIG. 11 was fabricated in the same manner as in Example 17 except that Polarizer B was used as polarizer 1, Retardation film B as optical retardation film 3, and Reflector B as reflector 5, without assembling a laminate sheet D beforehand, the polarizer 1 and optical retardation film 3 were laminated to the front side of the liquid crystal cell 12 and the light-scattering sheet 2 and reflector 5 to the back side of the liquid crystal cell 12. Since the light-scattering sheet 2 had a small retardation value, the light-scattering sheet 2 was laminated to the substrate sheet of the back electrode in such a manner that the alignment axis of the light-scattering sheet 2 would coincide with the polarization axis of the polarizer.

The display image of this reflecting liquid crystal display device was visually evaluated under fluorescent lamp. As a result, the specular reflection was found to have been diminished and a high-definition bright image of high contrast could be observed. Moreover, the surface (polarizer 1) of this reflecting type liquid crystal display device was not injured even when rubbed against with steel wool (#0000).

What is claimed is:

1. A light-scattering sheet comprising a light-scattering layer constituted of a plurality of polymers varying in refractive index and having an isotropic bicontinuous phase structure
    wherein the difference in refractive index between the plurality of polymers is 0.01 to 0.2, and the bicontinuous phase structure has an average interphase distance of 1 to 20 μm.

2. A light-scattering sheet according to claim 1 which is constituted of a first polymer and a second polymer differing from each other in refractive index and capable of undergoing phase separation of the lower critical solution temperature (LCST) type or the upper critical solution temperature (UCST) type, with the ratio of said first polymer to said second polymer being 10/90 to 90/10 (by weight).

3. A light-scattering sheet according to claim 2 wherein the lower critical solution temperature is 80 to 250° C.

4. A light-scattering sheet according to claim 1 wherein the average interphase distance of said bicontinuous phase is 2 to 10 μm and the thickness of the sheet is 1 to 300 μm.

5. A light-scattering sheet according to claim 1 which scatters incident light isotropically, gives a maximum diffuse light intensity at a diffusion angle of 3 to 60°, and has a total light transmittance value of 70 to 100%.

6. A light-scattering sheet according to claim 5 wherein, when the intensity of light transmitted through the light scattering sheet is plotted against the angle of diffusion θ, the ratio of the intensity of linearly transmitted light I (θ0) to the maximum intensity of diffuse transmitted light I (θmax) is 3000/1 to 1/1.

7. A liquid crystal display device comprising a liquid crystal cell containing a liquid crystal sealed therein, a polarizer disposed forwardly of said liquid crystal cell, and the light-scattering sheet claimed in claim 1.

8. A light-scattering sheet according to claim 1, wherein the plurality of polymers are capable of undergoing spinodal decomposition phase separation.

9. A light-scattering sheet which is constituted of a plurality of polymers undergoing phase separation of the lower critical solution temperature (LCST) type
    wherein the light-scattering sheet comprises a light-scattering layer constituted of a plurality of polymers varying in refractive index and having an isotropic bicontinuous phase structure
    wherein the difference in refractive index between the plurality of polymers is 0.01 to 0.2, and the bicontinuous phase structure has an average interphase distance of 1 to 20 μm.

10. A light-scattering sheet according to claim 9 wherein the lower critical solution temperature of a composition comprised of the plurality of polymers is 50 to 300° C.

11. A light-scattering sheet comprising a light-scattering layer constituted of a plurality of polymers varying in refractive index and having an isotropic bicontinuous phase structure
    wherein the difference in refractive index between the plurality of polymers is 0.01 to 0.2, and the bicontinuous phase structure has an average interphase distance of 1 to 20 μm;
    which is comprised of a plurality of polymers whose weight average molecular weights are 10,000 to 300,000.

12. A light-scattering sheet comprising a light-scattering layer constituted of a plurality of polymers varying in refractive index and having an isotropic bicontinuous phase structure
    wherein the difference in refractive -index between the plurality of polyers is 0.01 to 0.2, and the bicontinuous phase structure has an average interphase distance of 1 to 20 μm;
    which is comprised of a plurality of polymers selected from the group consisting of styrenic resin, (meth) acrylic resin, vinyl ether-series resin, halogen-containing resin, polycarbonate-series resin, polyester-series resin, polyamide-series resin, silicone-series resin, cellulose derivative, and rubber or elastomer.

13. A light-scattering composite sheet comprising a light-scattering sheet having an isotropic bicontinuous phase structure constituted of a plurality of polymers varying in refractive index, as laminated or formed on at least one side thereof, at least one member selected from the group consisting of a polarizer, a phase plate, a reflector, and a transparent conductive layer wherein the difference in refractive index between the plurality of polymers is 0.01 to 0.2, and the bicontinuous phase structure has an average interphase distance of 1 to 20 μm.

14. A light-scattering composite sheet according to claim 13 comprising a ternary laminate composed of a light-scattering sheet, a polarizer and an optical retardation film, with the polarizer forming the surface of the ternary laminate.

15. A reflection type liquid crystal display device comprising a liquid crystal cell constituted of a juxtaposed pair of a transparent front electrode plate composed of a transparent conductive layer and a substrate sheet supporting the transparent conductive layer and a back electrode plate composed of a conductive layer and a substrate sheet supporting the conductive layer, and a liquid crystal sealed between the two electrode plates, a polarizer disposed forwardly of said liquid crystal cell, and a light-scattering sheet disposed in at least one of the following modes (i) to (iii), said light-scattering sheet being constituted of a plurality of solid components varying in refractive index (i) the light-scattering sheet interposed between the polarizer and the front electrode plate (ii) the light-scattering sheet interposed between the back electrode plate and a reflector disposed behind said back electrode plate (iii) the light-scattering sheet functioning as a substrate sheet wherein the light-scattering sheet comprises a light-scattering layer constituted of a plurality of polymers varying in refractive index and having an isotropic bicontinuous phase structure wherein the difference in refractive index between the plurality of polymers is 0.01 to 0.2, and the bicontinuous phase structure has an average interphase distance of 1 to 20 $\mu$m.

16. A liquid crystal display device according to claim 15 wherein an optical retardation film is interposed between said polarizer and said liquid crystal cell and the light-scattering sheet is interposed between said polarizer and said optical retardation film or between said optical retardation film and said liquid crystal cell.

17. A liquid crystal display device according to claim 15 wherein a light-scattering composite sheet constituted of a light-scattering sheet and at least one functional layer selected from the group consisting of a polarizer, an optical retardation film, a reflector and a transparent conductive layer is disposed.

18. A method of producing a light-scattering sheet having an isotropic bicontinuous phase structure which comprises forming a composition of a plurality of polymers varying in refractive index into a sheet and subjecting the sheet to spinodal decomposition wherein the light-scattering sheet comprises a light-scattering layer constituted of a plurality of polymers varying in refractive index and having an isotropic bicontinuous phase structure wherein the difference in refractive index between the plurality of polymers is 0.01 to 0.2, and the bicontinuous phase structure has an average interphase distance of 1 to 20 $\mu$m.

19. A production method according to claim 18 wherein the bicontinuous phase structure is formed by heating a sheet undergoing phase separation of the LCST type at a temperature not lower than its lower critical solution temperature.

* * * * *